(12) United States Patent
Watanabe et al.

(10) Patent No.: US 10,979,619 B2
(45) Date of Patent: Apr. 13, 2021

(54) IMAGE CAPTURING APPARATUS CAPABLE OF HIGHLY-ACCURATE AUTOFOCUS CALIBRATION AND CONTROL METHOD THEREOF, AND STORAGE MEDIUM

(71) Applicant: CANON KABUSHIKI KAISHA, Tokyo (JP)

(72) Inventors: Naoki Watanabe, Atsugi (JP); Takuya Izumi, Yokohama (JP); Hirohito Kai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 16/260,340

(22) Filed: Jan. 29, 2019

(65) Prior Publication Data

US 2019/0246034 A1 Aug. 8, 2019

(30) Foreign Application Priority Data

Feb. 8, 2018 (JP) .............................. JP2018-021250

(51) Int. Cl.
| | |
|---|---|
| *H04N 5/232* | (2006.01) |
| *G02B 7/04* | (2021.01) |
| *H04N 5/3745* | (2011.01) |
| *H04N 5/235* | (2006.01) |

(52) U.S. Cl.
CPC .......... *H04N 5/23212* (2013.01); *G02B 7/04* (2013.01); *H04N 5/2353* (2013.01); *H04N 5/3745* (2013.01)

(58) Field of Classification Search
CPC ............ H04N 5/23212; H04N 5/3745; H04N 5/2353; H04N 5/232122; H04N 5/23222; H04N 5/243; H04N 5/232127; H04N 5/232133; G02B 7/04; G02B 7/34; G03B 13/36
See application file for complete search history.

(56) References Cited

U.S. PATENT DOCUMENTS

2011/0115967 A1* 5/2011 Lee ..................... H04N 5/23219
348/349
2013/0004082 A1* 1/2013 Kano ....................... G06T 5/002
382/195

(Continued)

FOREIGN PATENT DOCUMENTS

| JP | 4378141 B | 12/2009 |
|---|---|---|
| JP | 2016-142853 A | 8/2016 |

*Primary Examiner* — Hung H Lam
(74) *Attorney, Agent, or Firm* — Cowan, Liebowitz & Latman, P.C.

(57) ABSTRACT

An image capturing apparatus comprises an image sensor, a display, a processor; and a memory holding a program which makes the processor function as a focus detection unit for detecting a focus position of the imaging lens, an imaging control unit configured to carry out the focus bracketing, and a display control unit configured to cause the display device to display a guide indicating a first area and a second area before the focus bracketing is carried out, the first area being an area in which an object suitable for focus detection of the imaging lens by the focus detection unit is arranged, and the second area being an area in which an object suitable for a user to determine an image that is in focus is arranged.

18 Claims, 33 Drawing Sheets

(56) References Cited

U.S. PATENT DOCUMENTS

| | | | |
|---|---|---|---|
| 2013/0135510 A1* | 5/2013 | Lee .................. | H04N 5/232935 |
| | | | 348/333.02 |
| 2013/0176458 A1* | 7/2013 | Van Dalen ............. | H04N 5/232 |
| | | | 348/231.99 |
| 2015/0156079 A1* | 6/2015 | Satterlee ............. | H04L 41/0893 |
| | | | 709/223 |

\* cited by examiner

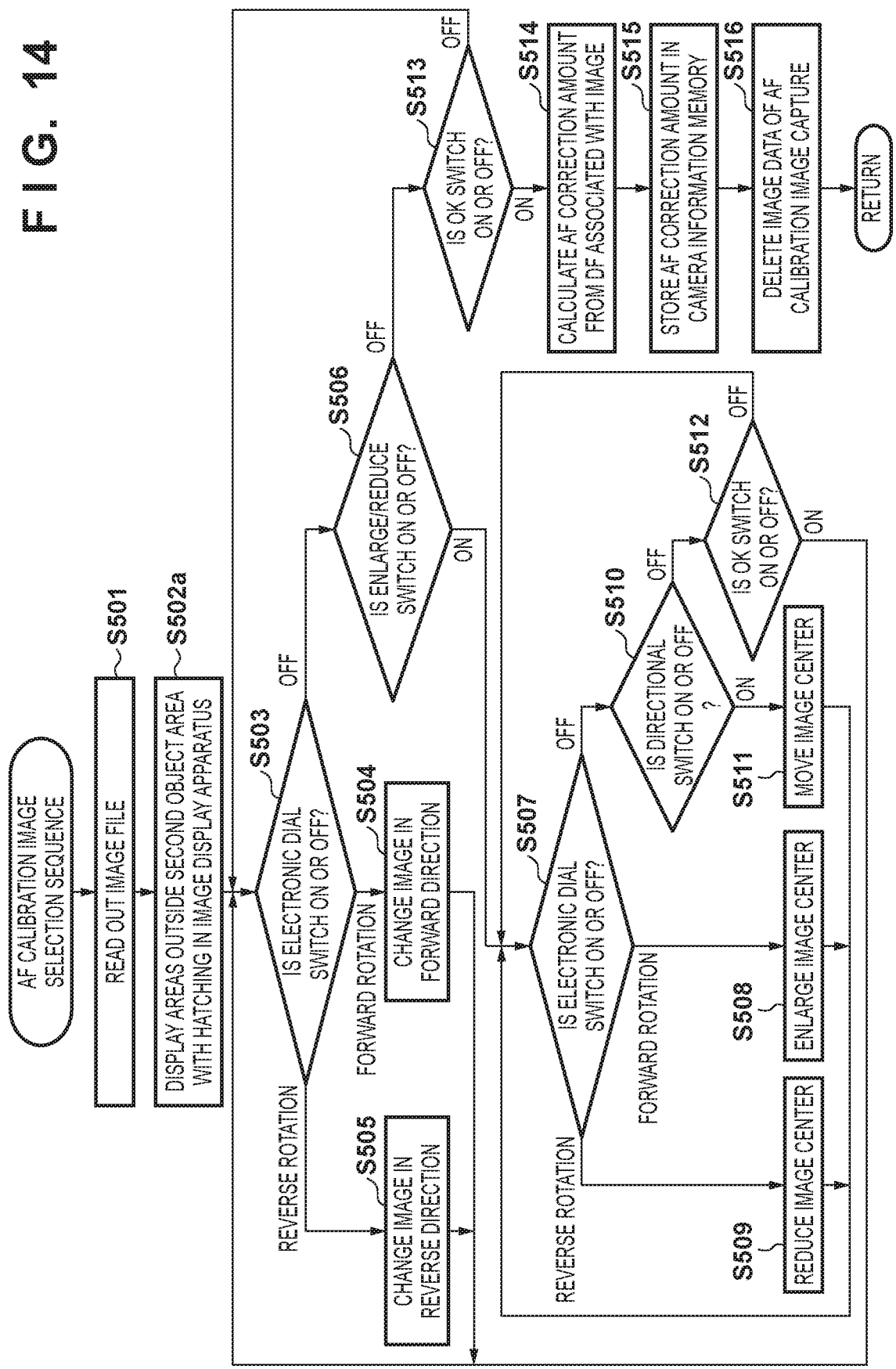

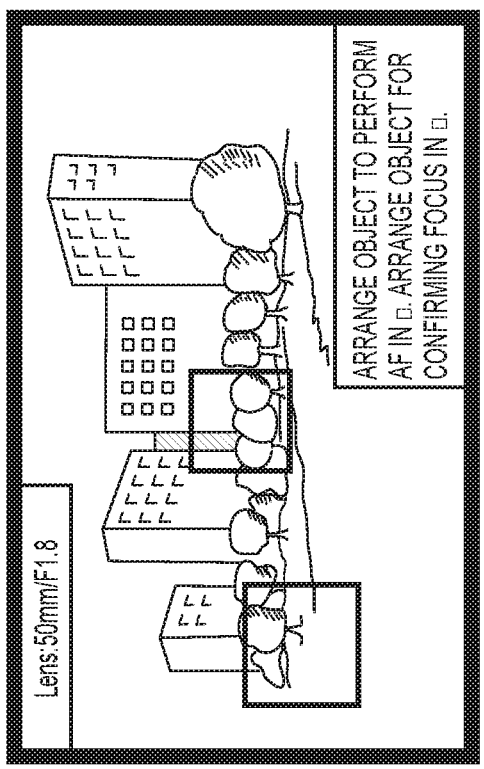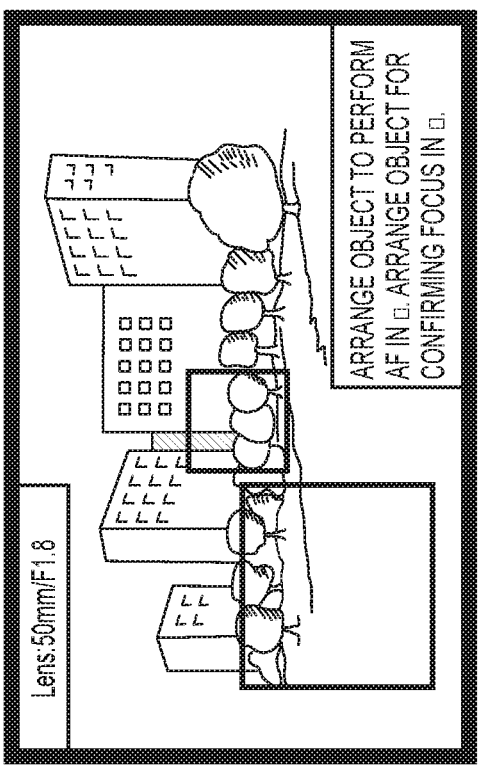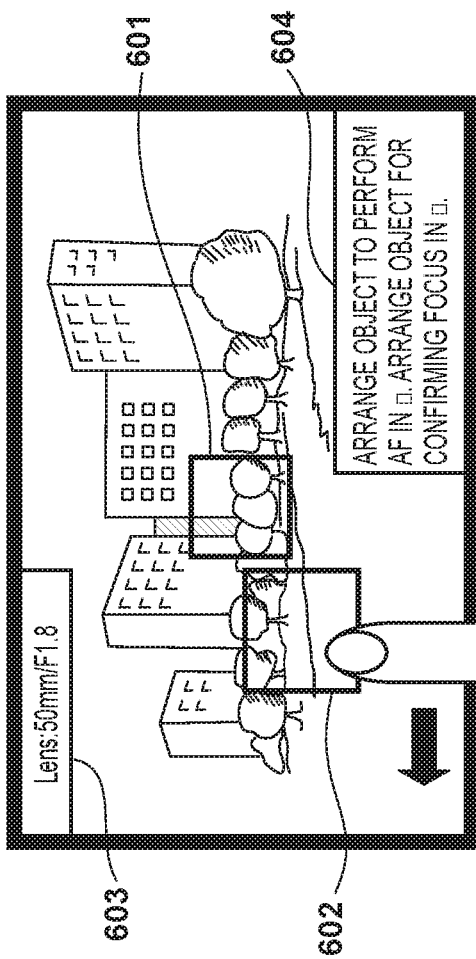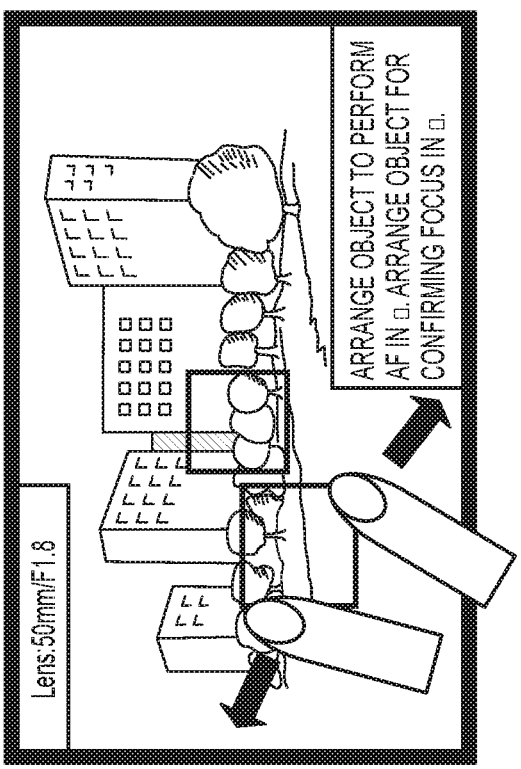

F I G. 22
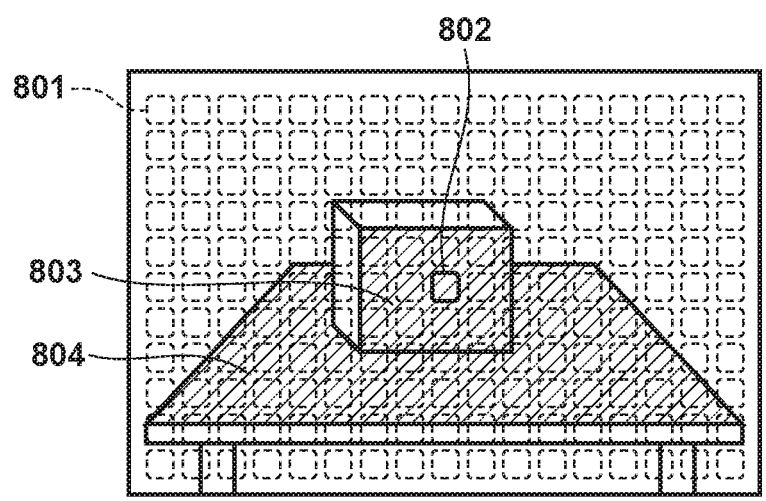

| 12 | 11 | 13 | 12 | 11 | 11 | 12 | 13 | 12 |
|----|----|----|----|----|----|----|----|----|
| 12 | 4  | 3  | 6  | 1  | 5  | 12 | 13 | 12 |
| 11 | 3  | 1  | 0  | 0  | -1 | 11 | 12 | 11 |
| 8  | 4  | 0  | -1 | 0  | 1  | 7  | 10 | 4  |
| 2  | 3  | 0  | 1  | 0  | 0  | 4  | 8  | 9  |
| -4 | 2  | 1  | -3 | 2  | -4 | 1  | 2  | -2 |
| -7 | -4 | -1 | -2 | -7 | -4 | -2 | -6 | -5 |

FIG. 24C

| 12 | 11 | 13 | 12 | 11 | 11 | 13 | 12 | 12 |
|----|----|----|----|----|----|----|----|----|
| 12 | 7  | 3  | 4  | 4  | 3  | 10 | 11 | 12 |
| 11 | -1 | 0  | 1  | 0  | -1 | 8  | 12 | 11 |
| 7  | 3  | 0  | -1 | 0  | 0  | 7  | 7  | 8  |
| 3  | 1  | -1 | 1  | 0  | -1 | 2  | 3  | 2  |
| -2 | -2 | -2 | -2 | -3 | -2 | -2 | -2 | -2 |
| -5 | -4 | -5 | -5 | -5 | -5 | -5 | -5 | -5 |

IMAGE CAPTURING APPARATUS CAPABLE OF HIGHLY-ACCURATE AUTOFOCUS CALIBRATION AND CONTROL METHOD THEREOF, AND STORAGE MEDIUM

BACKGROUND OF THE INVENTION

Field of the Invention

The present invention relates to automatic focusing (AF) techniques in image capturing apparatuses.

Description of the Related Art

Thus far, TTL-type autofocus (AF; automatic focusing) methods have been widely used in camera systems having interchangeable imaging lenses. In such a camera system, the in-focus position will vary due to manufacturing error in the imaging lenses, and there are therefore cases where the in-focus position of the AF on the camera side is different from the in-focus position of the imaging lens. Image capturing apparatuses equipped with functions for adjusting the AF in-focus position from imaging lens to imaging lens (called "AF calibration") have therefore been available for some time.

Japanese Patent No. 4378141 discloses an image capturing apparatus having such an AF calibration function. Specifically, multiple images are captured while shifting the focus position of the imaging lens by minute amounts forward and backward from the AF in-focus position set at the time of manufacture (known as "focus bracketing"), and a user is then allowed to select the image that has the best focus among the group of images that have been captured. An AF correction amount associated with the selected image is then recorded in the camera.

With this type a method for inputting the AF correction amount, the accuracy at which the user selects the in-focus image is directly linked to the accuracy of the AF correction amount. Accordingly, as a method through which the user can accurately select an in-focus image, Japanese Patent Laid-Open No. 2016-142853, for example, proposes a method in which an image display in an AF calibration mode is made different from an image display in a normal image capture mode.

Here, when carrying out such AF calibration, an object that is suitable for calculating a defocus amount with a known AF technique is preferable as the object used during focus bracketing. Specifically, this is an object having a perpendicular (flat) plane relative to the image capture optical axis, and having a high brightness contrast.

On the other hand, in a case where the user selects an in-focus image from a plurality of images captured through focus bracketing, it is difficult to determine slight shifts in focus from images captured of a flat object. In order to confirm focus shifts from an image, it is desirable that an object exhibiting depth be present near the object being used for AF (the above-described flat object). However, in focus bracketing for the purpose of focus calibration, the user will not necessarily capture a flat object and an object exhibiting depth within the same image. There has thus been a problem in that mistakes are likely to occur when selecting the in-focus image, resulting in the AF calibration not being carried out correctly.

SUMMARY OF THE INVENTION

Having been conceived in light of the above-described issue, the present invention suppresses situations where, in an image capturing apparatus having an AF calibration function, a user makes a mistake when selecting an in-focus image.

According to a first aspect of the present invention, there is provided an image capturing apparatus comprising: an image sensor configured to capture an object image formed by an imaging lens; a display configured to display an image captured through a focus bracketing; a processor; and a memory holding a program which makes the processor function as; a focus detection unit for detecting a focus position of the imaging lens; an imaging control unit configured to carry out the focus bracketing in which the imaging control unit causes the image sensor to capture a plurality of images while controlling the focus position of the imaging lens to change by predetermined amounts at a time; and a display control unit configured to cause the display device to display a guide indicating a first area and a second area before the focus bracketing is carried out, the first area being an area in which an object suitable for focus detection of the imaging lens by the focus detection unit is arranged, and the second area being an area in which an object suitable for a user to determine an image that is in focus is arranged.

According to a second aspect of the present invention, there is provided a method of controlling an image capturing apparatus, the image capturing apparatus including an image sensor that captures an object image formed by the imaging lens and a focus detection unit for detecting a focus position of the imaging lens, the method comprising: carrying out focus bracketing in which the image sensor is caused to capture a plurality of images while the focus position of the imaging lens is caused to change by predetermined amounts at a time; displaying an image captured through the focus bracketing in a display device; and causing the display device to display a guide indicating a first area and a second area before the focus bracketing is carried out, the first area being an area in which an object suitable for focus detection of the imaging lens by the focus detection unit is arranged, and the second area being an area in which an object suitable for a user to determine an image that is in focus is arranged.

Further features of the present invention will become apparent from the following description of exemplary embodiments with reference to the attached drawings.

BRIEF DESCRIPTION OF THE DRAWINGS

FIG. 14 is a flowchart illustrating an AF calibration image selection sequence carried out by an image capturing apparatus according to a second embodiment.

FIGS. 18A to 18D are diagrams illustrating images displayed in a display apparatus before the AF calibration image capture according to the third embodiment.

FIG. 22 is a diagram illustrating an object image, and a focus detection area in the object image, according to a sixth embodiment.

FIGS. 24A to 24C are diagrams illustrating a focus detection area and a reference focus detection area according to the sixth embodiment.

DESCRIPTION OF THE EMBODIMENTS

Hereinafter, embodiments of the present invention will be described in detail with reference to the appended drawings.

First Embodiment

Figure 1:
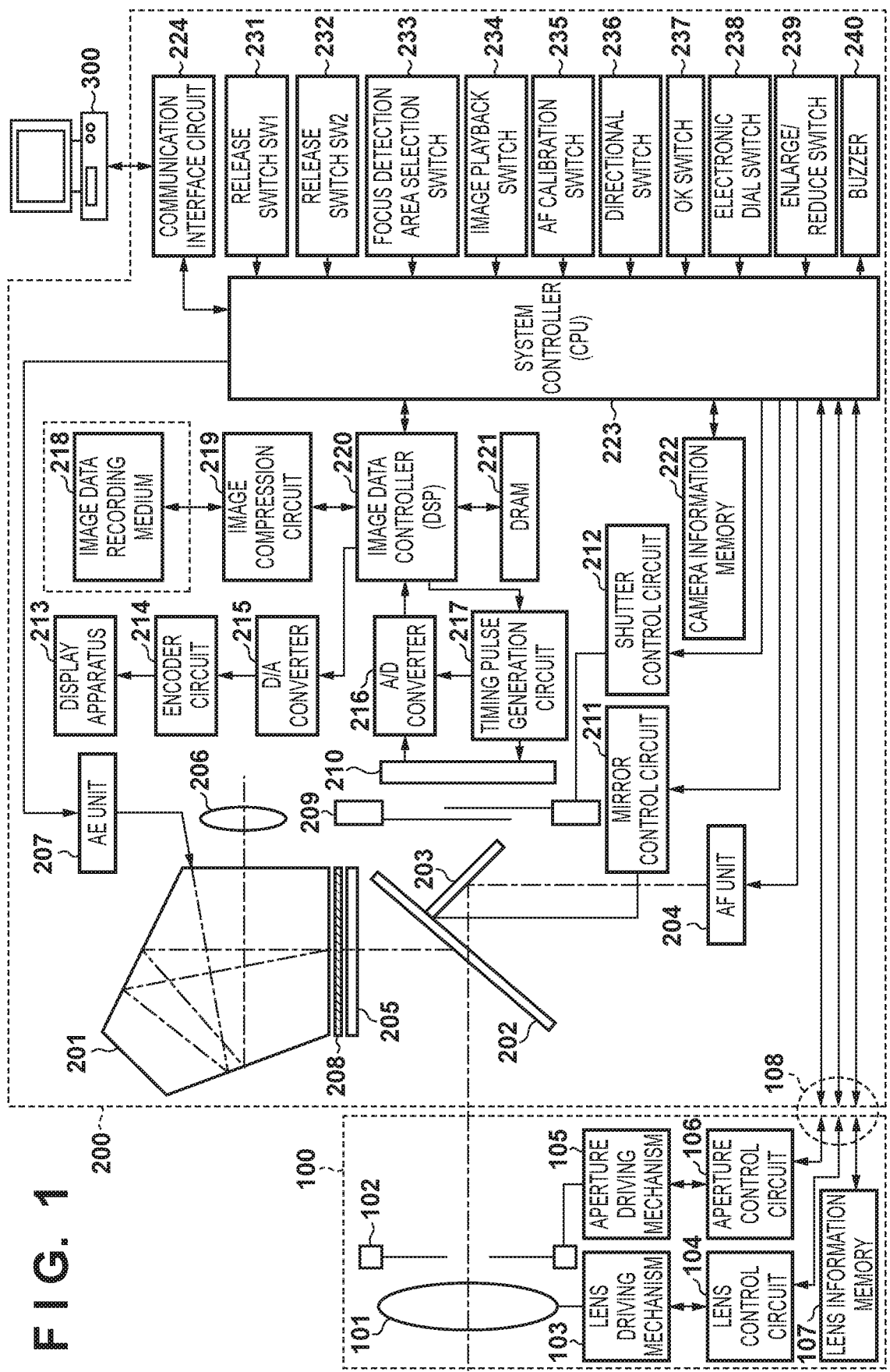
FIG. 1 is a block diagram illustrating the configuration of an image capturing apparatus according to a first embodiment of the present invention.

FIG. 1 is a block diagram illustrating the configuration of a camera system serving as a first embodiment of an image capturing apparatus according to the present invention. FIG. 1 illustrates a state in which an imaging lens 100 has been removably attached to a camera (image capturing apparatus main body) 200 using a lens mount mechanism of a mount part (not shown).

The configuration of the imaging lens 100 will be described first. The mount part is provided with an electrical contact point unit 108. The imaging lens 100 and the camera 200 communicate via the electrical contact point unit 108. A focus lens 101 adjusts a position where an object image is formed. Although FIG. 1 illustrates only the focus lens 101 as a lens within the imaging lens 100, a zoom lens, a fixed lens, or the like may also be provided. A lens driving mechanism 103 includes a stepping motor for driving the focus lens 101. However, the mechanism is not limited to a stepping motor, and an ultrasonic motor or the like may be used instead.

An aperture 102 adjusts the brightness of the object image. The aperture 102 is in a normally-open state, and is driven to reduce the size of the opening therein so that a desired exposure is achieved for the object image during image capture. An aperture driving mechanism 105 drives the aperture 102. Although an electromagnetic driving actuator is used in the present embodiment, the driving method is not limited thereto.

A lens control circuit 104 controls the driving of the lens driving mechanism 103. An aperture control circuit 106 controls the driving of the aperture driving mechanism 105. The lens control circuit 104 and the aperture control circuit 106 are electrically connected to the camera 200 via the aforementioned electrical contact point unit 108, and communicate with a system controller 223, which controls the camera 200 as a whole. Lens information memory 107 is storage means that store information of the lens 100. Information of a focal length, aperture value, and so on, lens ID information, and the like of the imaging lens 100 is stored.

The configuration of the camera 200 will be described next. A light beam from an object (the dot-dash line in FIG. 1) is guided to a quick-return mirror 202 within the camera 200, via the focus lens 101 and the aperture 102 within the imaging lens 100. The quick-return mirror 202 is arranged within the image capture optical path at an angle relative to the optical axis, and is capable of moving between a first position, where the quick-return mirror 202 conducts the light beam from the object to a viewfinder optical system located above (the position illustrated in FIG. 1), and a second position, where the quick-return mirror 202 withdraws outside the image capture optical path.

A central part of the quick-return mirror 202 is a half mirror, and the light beam from the object is partially transmitted through the half mirror part when the quick-return mirror 202 is down in the first position. The transmitted light beam is reflected by a sub mirror 203, which is a fully-reflecting mirror provided behind the quick-return mirror 202, and is guided to an AF unit 204 that carries out focus detection for autofocus (AF).

The AF unit 204 is a unit including optical components such as a condenser lens, a separator lens, and the like, an AF sensor, which is a photoelectric conversion element, and an AF circuit for driving the AF sensor. The AF unit 204 carries out focus detection (calculates a defocus amount) through what is known as a secondary image-forming phase difference system. The result of the focus detection carried out by the AF unit 204 is sent to the system controller 223, and is used in focus adjustment control during image capture. Using the AF sensor, the AF unit 204 carries out the focus detection for the imaging lens 100 in a focus detection area selected by a user or by a system controller (mentioned later) from among a plurality of areas (focus detection areas) within the image capture plane.

Meanwhile, the light beam reflected by the quick-return mirror 202 reaches a focusing screen 205. The focusing screen 205 is arranged in a position optically equivalent to an image sensor 210 (mentioned later), and the object image is formed on the focusing screen 205. The object image formed on the focusing screen 205 reaches the user's (shooter's) eye via a pentaprism 201 and an ocular lens 206. The pentaprism 201 serves to bend the light beam so that the object image on the focusing screen 205 can be seen by the user as an upright image. The ocular lens 206 enlarges and reforms the object image so that the image is easier for the user to see. What is known as an optical viewfinder is constituted by this configuration, and the user can confirm the object image through the ocular lens 206 before the image capture. An in-viewfinder information display apparatus 208 for displaying the focus detection area, image capture conditions, and the like is arranged between the focusing screen 205 and the pentaprism 201. In the present embodiment, a PN liquid crystal panel capable of electrically switching between transmitting and blocking light is used as the in-viewfinder information display apparatus 208.

An AE unit 207 is a unit including optical components such as an image forming lens, an aperture, and the like, an AE sensor, which is a photoelectric conversion element, and an AE circuit for driving the AE sensor. The AE unit 207 measures the light of the object image via the pentaprism 201. The photometry result from the AE unit 207 is sent to the system controller 223 and used in exposure control during image capture.

When the quick-return mirror 202 is up in the second position, the light beam from the imaging lens 100 reaches the image sensor 210 via a focal plane shutter 209, which is a mechanical shutter. Note that when the quick-return mirror 202 is up in the second position, the sub mirror 203 is also folded up with respect to the quick-return mirror 202 and is thus withdrawn outside the image capture optical path.

The image sensor 210 is an image sensor such as a CCD or CMOS sensor. In the present embodiment, the image sensor 210 has a function for capturing moving images as well as still images. The focal plane shutter 209 is configured to include a front curtain and a rear curtain, and transmits or blocks the light beam from the imaging lens 100. The exposure time of the image sensor 210 can be controlled by controlling the timing at which the front curtain and rear curtain are driven.

The image capturing apparatus 200 according to the present embodiment includes the system controller 223, which controls the camera system as a whole. The system controller 223 is constituted by a CPU, an MPU, or the like, and controls the operations of various circuits and the like described later.

The system controller 223 is also connected to camera information memory 222, which stores parameters requiring adjustment when controlling the camera system as a whole, camera identification (ID) information serving as unique information for identifying the individual image capturing apparatus 200, adjustment values for parameters pertaining to image capturing, which are adjusted using a reference lens (an imaging lens used during adjustments prior to shipping the camera), and the like. In the present embodiment, EEPROM (non-volatile memory) is used as the camera information memory 222. The camera information memory 222 stores AF correction values set in an AF calibration mode (described later).

The system controller 223 is also connected to a mirror control circuit 211. The mirror control circuit 211 drives the quick-return mirror 202 up and down under the control of the system controller 223. The system controller 223 is also connected to a shutter control circuit 212. The shutter control circuit 212 controls the driving of the travel of the front curtain and rear curtain in the focal plane shutter 209, in response to signals from the system controller 223. The drive source of the front curtain and rear curtain of the focal plane shutter 209 is constituted by a spring, and after the shutter has traveled, it is necessary to charge the spring for the next operation. The shutter control circuit 212 also controls this spring charge operation.

The system controller 223 communicates with the lens control circuit 104 and the aperture control circuit 106 within the imaging lens 100 through the electrical contact point unit 108. The lens control circuit 104 controls the lens driving mechanism 103 in response to signals from the system controller 223, and focuses by driving the focus lens 101 in the optical axis direction. The aperture control circuit 106 controls the aperture driving mechanism 105, which drives the aperture 102, in response to signals from the system controller 223.

The system controller 223 communicates with the lens information memory 107 through initial communication carried out when the imaging lens 100 is mounted. The system controller 223 stores information, which has been stored in the lens information memory 107, in the camera information memory 222.

An image data controller 220 is connected to the system controller 223. The image data controller 220 is a correction data sampling circuit and a correction circuit constituted by a digital signal processor (DSP), and corrects and processes image data input from the image sensor 210 on the basis of commands from the system controller 223.

A timing pulse generation circuit 217, an A/D converter 216, DRAM 221, a D/A converter 215, and an image compression circuit 219 are connected to the image data controller 220. The timing pulse generation circuit 217 outputs pulse signals required when driving the image sensor 210. The A/D converter 216 receives the timing pulse generated by the timing pulse generation circuit 217 along with the image sensor 210, and converts an analog signal corresponding to the object image, which has been output from the image sensor 210, into a digital signal. The DRAM 221 temporarily stores the obtained image data (image data which is digital data prior to processing, conversion to a predetermined format, and so on).

A display apparatus 213 is connected to the D/A converter 215 via an encoder circuit 214. Furthermore, an image data recording medium 218 is connected to the image compression circuit 219. The display apparatus 213 is an apparatus for displaying image data captured by the image sensor 210, and in the present embodiment, is a unit including a liquid crystal panel capable of color display, a backlight, and a display control circuit for driving these elements.

The image data controller 220 converts the image data in the DRAM 221 into an analog signal through the D/A converter 215 and outputs the analog signal to the encoder circuit 214. The encoder circuit 214 converts the output of the D/A converter 215 into a video signal (e.g., an NTSC signal) that is necessary when driving the display apparatus 213.

The image compression circuit 219 is a circuit for compressing and converting the image data stored in the DRAM 221 (e.g., converting the data to JPEG data). The converted image data is stored in the image data recording medium 218. Semiconductor memory or the like is used as this image data recording medium 218.

The camera 200 is provided with a communication interface circuit 224 for connecting to an external device 300 such as a personal computer. The system controller 223 can communicate with the external device 300 via the communication interface circuit 224.

Operation members for accepting user operations are connected to the system controller 223. A release switch SW1 (231) is a switch for starting image capture preparation operations, such as photometry, setting the focus detection area, and so on. A release switch SW2 (232) is a switch for starting image capture operations (charge accumulation and charge readout operations for obtaining a still image).

A focus detection area selection switch 233 transitions to a mode for selecting a focus detection area for the purpose of AF when operated. An image playback switch 234 transitions to a mode for playing back a captured image when operated. An AF calibration switch 235 transitions to the AF calibration mode when operated. A directional switch 236 is a switch that can be operated in four directions, namely up, down, left, and right, and specifies inputs in each of those directions. This is used to select among multiple options, move a cursor, and the like in each of the modes. An OK switch 237 is a switch for finalizing a selection. An electronic dial switch 238 is a rotating dial-type switch, and is used to select among multiple options, enlarge and reduce images, and the like. An enlarge/reduce switch 239 is used in an image playback mode, and starts operations for enlarging or reducing an image. A buzzer 240 emits sounds corresponding to various types of operations, alarm sounds, and so on. Note that the operation members according to the present embodiment are not limited to the forms and so on described in the present embodiment, as long as the operation members can achieve the same effects.

Figure 2:
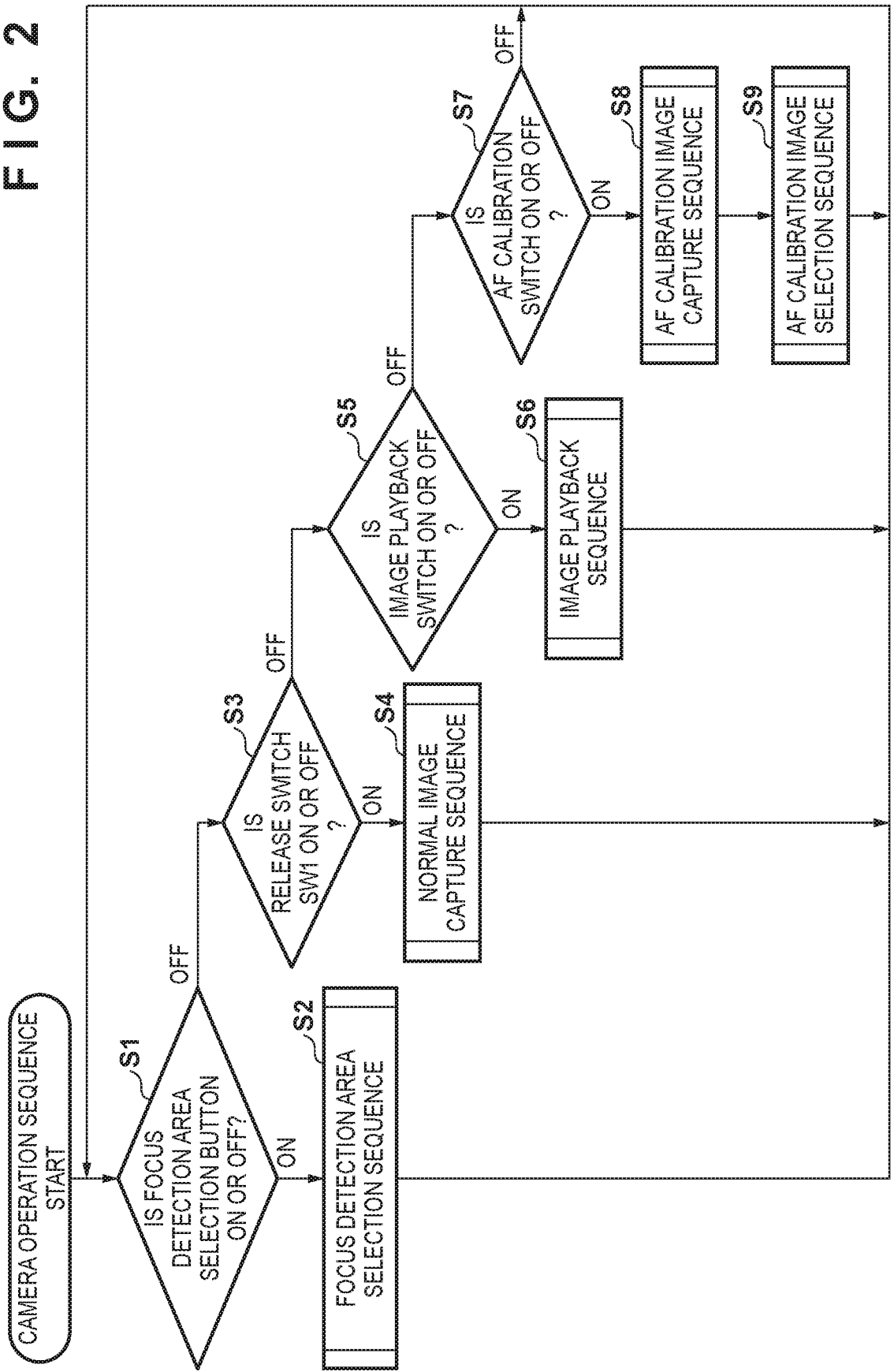
FIG. 2 is a flowchart illustrating an operation sequence of the image capturing apparatus according to the first embodiment.

Next, an operation sequence carried out by the camera 200 according to the present embodiment will be described. FIG. 2 is a flowchart illustrating the operation sequence carried out by the camera 200 according to the present embodiment. The processes in this flowchart are realized by the system controller 223 executing programs stored in the camera information memory 222. Note that the same applies to the sub sequences described later.

First, the operations of the camera 200 are started when a power switch (not shown) is turned on. Immediately after the sequence is started, the camera 200 is in a state of accepting operations of the operation members by the user. The processing branches thereafter depending on which operation member is operated. Normally, when an image capture sequence is started, the quick-return mirror 202 and the sub mirror 203 are down as illustrated in FIG. 1, and the focal plane shutter 209 is in a light-blocking state.

Figure 3A:
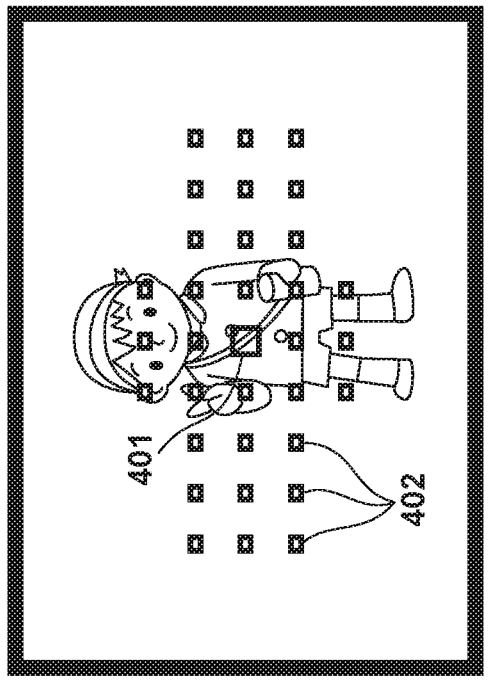
FIGS. 3A to 3D are diagrams illustrating object images that can be confirmed by a user through an ocular lens, according to the first embodiment.

FIGS. 3A to 3D are diagrams illustrating an object image that can be confirmed by the user through the ocular lens 206 of the image capturing apparatus according to the present embodiment. An object image such as that illustrated in FIG. 3A can be observed immediately after the camera 200 is started up. FIG. 3A indicates a state where a pattern displayed by the in-viewfinder information display apparatus 208 is superimposed on the object image (a person) in the focusing screen 205. A frame 401 located in the center indicates the focus detection area for AF.

In step S1, it is determined whether or not the focus detection area selection switch 233 has been operated. If the switch has been operated, the process moves to step S2, and in step S2, sub sequence processing of a focus detection area selection sequence is carried out.

In step S3, it is determined whether or not the release switch SW1 (231) has been operated. If the switch has been operated, the process moves to step S4, and in step S4, sub sequence processing for a normal image capture sequence is carried out.

In step S5, it is determined whether or not the image playback switch 234 has been operated. If the switch has been operated, the process moves to step S6, and in step S6, sub sequence processing for an image playback sequence is carried out.

In step S7, it is determined whether or not the AF calibration switch 235 has been operated. If the switch has been operated, the process moves to step S8, and in step S8, sub sequence processing for an AF calibration image capture sequence is carried out. Then, in step S9, sub sequence processing for AF calibration image selection is carried out.

The "AF calibration mode" is a mode for setting an "AF correction amount" for correcting skew in the in-focus position for each imaging lens. When the imaging lens 100 attached to the camera 200 changes, variations arise in the in-focus position detected by the AF unit 204 due to manufacturing error in the imaging lenses themselves. To solve this problem, the camera 200 can save an AF correction amount for correcting the in-focus position in the camera information memory 222 for each imaging lens.

Figure 4:
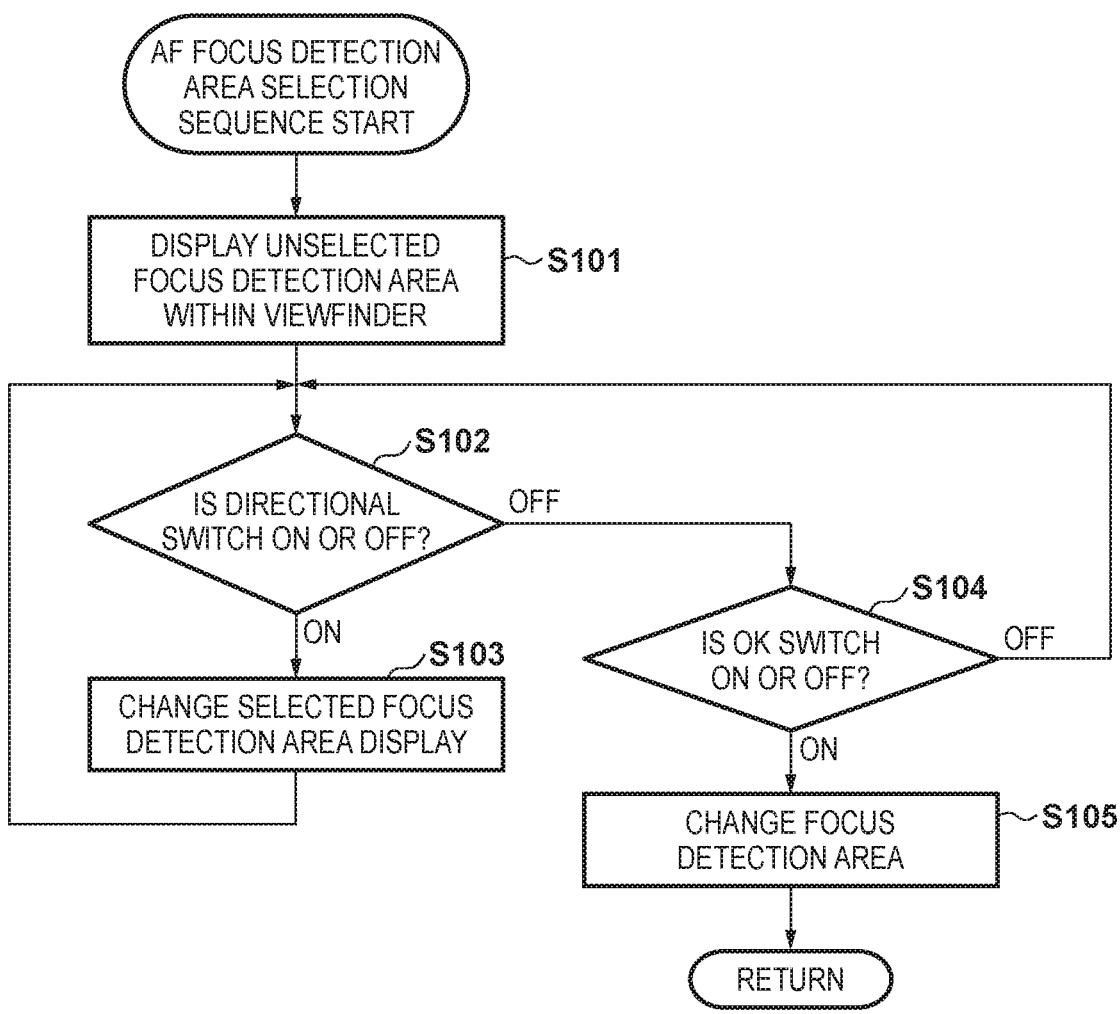
FIG. 4 is a flowchart illustrating a focus detection area selection sequence carried out by the image capturing apparatus according to the first embodiment.

FIG. 4 is a flowchart illustrating operations in the focus detection area selection sequence carried out by the camera 200 according to the present embodiment.

Figure 3B:
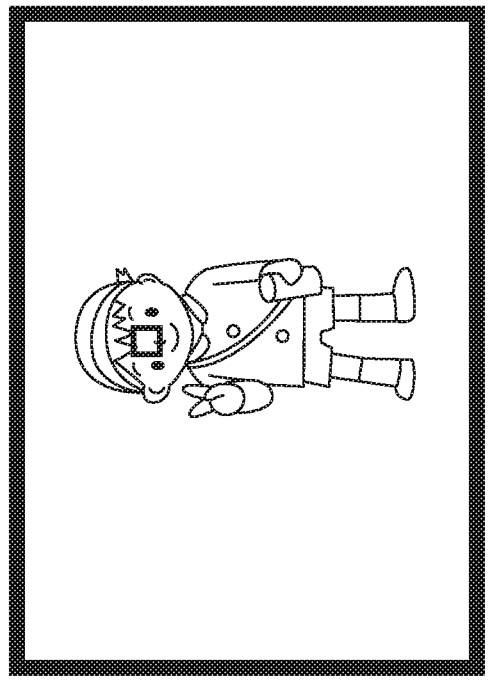
Figure 3C:
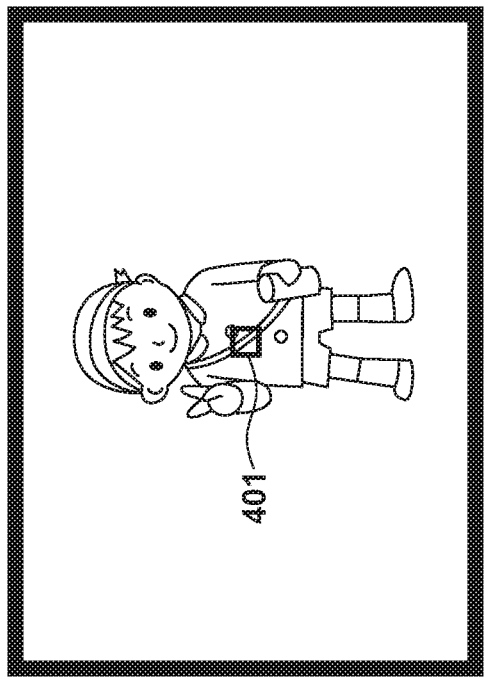

In step S101, the in-viewfinder information display apparatus 208 displays an unselected focus detection area. At this time, the object image is displayed as indicated in FIG. 3B. The unselected focus detection area frame is indicated by reference sign 402. Once the process of step S101 has ended, the camera 200 stands by for an operation from the user, and the process branches to step S102 or step S104.

In step S102, it is determined whether or not the directional switch 236 has been operated. If the switch has been operated, the process moves to step S103, whereas if the switch has not been operated, the process moves to step S104.

In step S103, the display switches between the selected focus detection area frame 401 and the unselected focus detection area frame 402 in accordance with the direction of the operation. For example, the state illustrated in FIG. 3C results from the directional switch 236 being operated upward from the state illustrated in FIG. 3B. It can be confirmed that the selected area has moved two places upward.

Figure 3D:
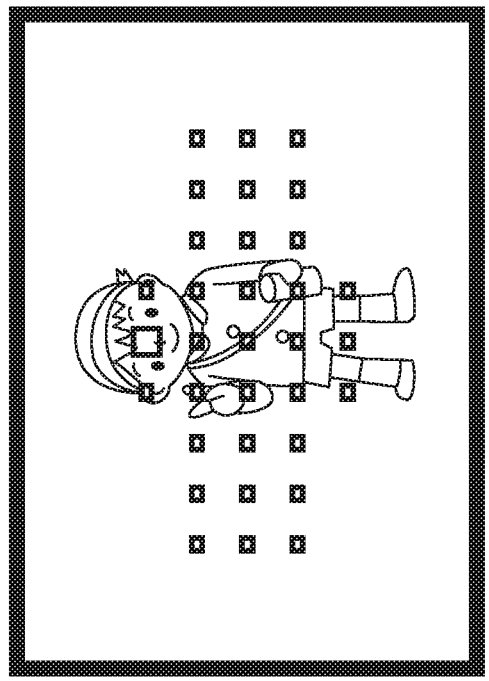

In step S104, it is determined whether or not the OK switch 237 has been operated. If the switch has been operated, the process moves to step S105, whereas if the switch has not been operated, the process returns to step S102. In step S105, the selection of the focus detection area is considered complete, and the process returns to the camera operation sequence. The object image is as illustrated in FIG. 3D upon this process ending.

Figure 5:
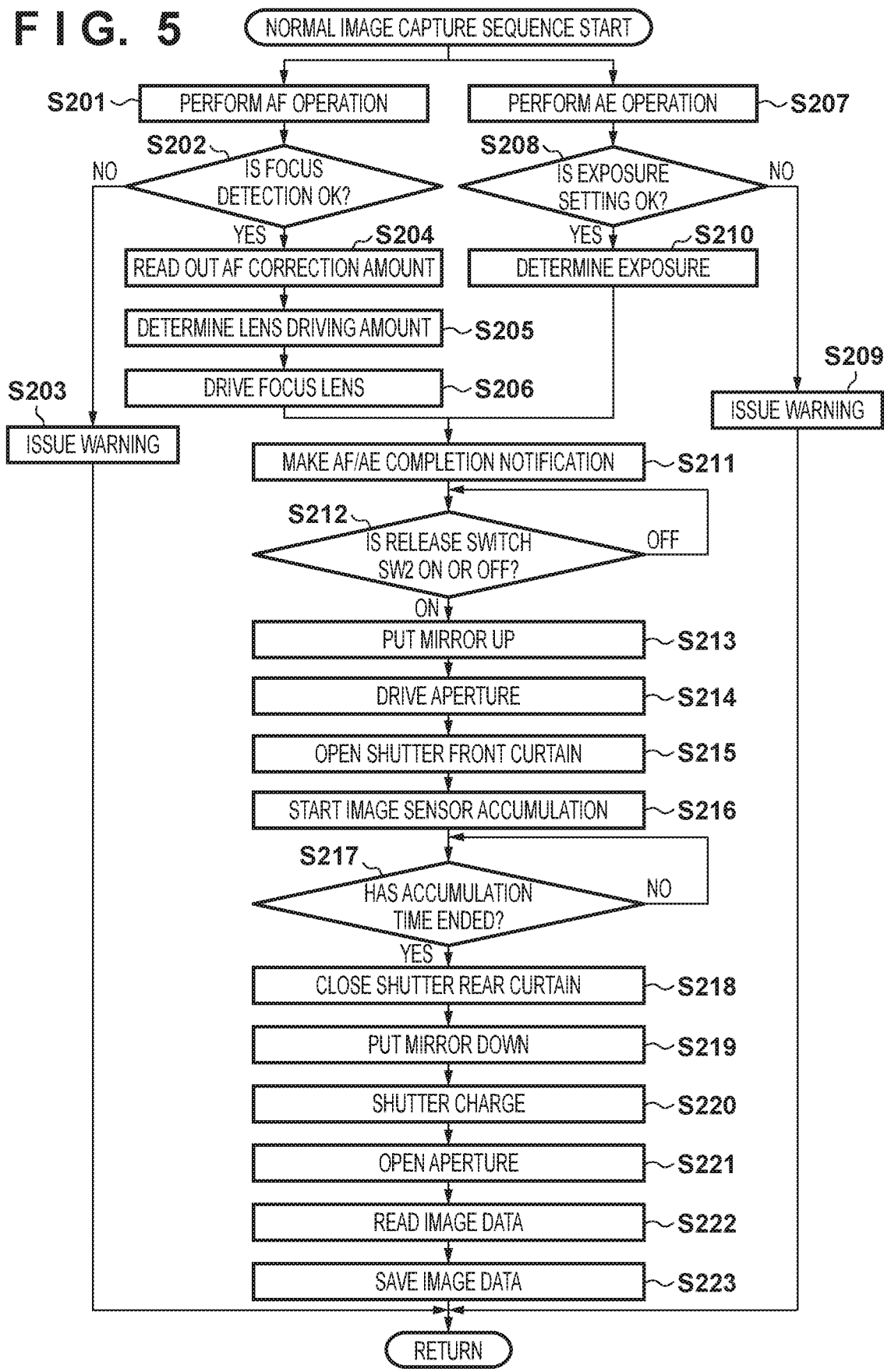
FIG. 5 is a flowchart illustrating a normal image capture sequence carried out by the image capturing apparatus according to the first embodiment.

FIG. 5 is a flowchart illustrating operations in the normal image capture sequence carried out by the image capturing apparatus according to the present embodiment. Upon being started, the sequence branches to step S201, in which focus detection (defocus amount calculation) is carried out for the object, and to step S207, in which an exposure amount is determined, and these operations are carried out in parallel.

In step S201, the AF unit 204 carries out focus detection for the object. The focus detection is carried out in the focus detection area selected as indicated in FIG. 3D, among the plurality of focus detection areas.

As described above, the AF unit 204 carries out the focus detection through the secondary image-forming phase difference system. The object image is divided into two images by the separator lens within the AF unit, and these images are formed on the AF sensor. The object images formed on the AF sensor are photoelectrically converted, and illumination distributions of the two images are obtained as electrical signals. A phase difference between the two images is calculated by carrying out a correlation operation for the obtained electrical signals of the two images, and the defocus amount can be obtained from the phase difference. With respect to the division of the object image into two images, multiple directions can be considered as the directions for the division. In the present embodiment, an AF sensor in which an object image divided in the vertical direction is formed is called a vertical sensor, whereas an AF sensor in which an object image divided in the horizontal direction is formed is called a horizontal sensor. Here, the division direction will be called a "correlation direction". The vertical sensor is a detection sensor that can obtain the defocus amount from the phase difference between the two images, for an object image having contrast in the vertical direction (e.g., horizontal lines). The horizontal sensor is a detection sensor that can obtain the defocus amount from the phase difference between the two images, for an object image having contrast in the horizontal direction (e.g., vertical lines).

In step S202, it is determined whether or not the focus detection was successful. If the focus detection was not successful, the process moves to step S203, where a warning is issued. The warning is issued through a method such as displaying an error message in the in-viewfinder information display apparatus 208, causing the buzzer 240 to emit an alarm sound, or the like. If the focus detection was successful, the process moves to step S204.

In step S204, the AF correction amount pertaining to the imaging lens 100 that is mounted is read out from the camera information memory 222 and the lens information memory 107. Note that the default setting for the AF correction amount is "0", i.e., that there is no correction amount, and the correction amount is input for the first time in response to the AF calibration mode being set.

In step S205, an amount by which the focus lens 101 is to be driven is determined on the basis of the focus detection result (the defocus amount) and the AF correction amount. Specifically, the amount is calculated according to the following expression.

lens driving amount=focus detection result (defocus amount)+AF correction amount In step S206, the determined lens driving amount is sent to the lens control circuit 104, and the lens control circuit 104 converts data of the received lens driving amount into a number of drive pulses to be supplied to the stepping motor of the lens driving mechanism 103. By driving the stepping motor and moving the focus lens 101 on the basis of the number of drive pulses, the focus is adjusted for the object image.

On the other hand, in step S207, the object image formed on the focusing screen 205 through the imaging lens 100 is subjected to photometry by the AE unit 207. An exposure setting value prioritizing the vicinity of the selected focus detection area is calculated in accordance with the output of the AE unit 207. Specifically, the aperture value (F-stop number) of the imaging lens, the charge accumulation time of the image sensor 210 (shutter speed), and the gain of the image sensor 210 (ISO sensitivity) are determined.

In step S208, it is determined whether or not the exposure setting was successful. If the exposure setting was not successful, the process moves to step S209, where a warning is issued. The warning is issued through a method such as displaying an error message in the in-viewfinder information display apparatus 208, causing the buzzer 240 to emit an alarm sound, or the like.

The exposure is determined in step S210. The exposure conditions determined in step S210 are stored within the system controller 223.

In step S211, the user is notified that the focus adjustment and exposure setting are complete. Specifically, the notification is carried out through a method such as displaying an indication that the focus adjustment is complete in the in-viewfinder information display apparatus 208, causing the buzzer 240 to emit a sound, or the like.

In step S212, it is determined whether or not the release switch SW2 (232) has been operated. If the switch has been operated, the process moves to step S213. If the switch has not been operated, the apparatus stands by.

In step S213, the quick-return mirror 202 is driven upward by communicating with the mirror control circuit 211. In step S214, the information of the aperture value set in step S210 is sent to the aperture control circuit 106. Then, the aperture control circuit 106 drives the aperture driving mechanism 105, and the aperture 102 is adjusted to the set aperture value.

In step S215, the focal plane shutter 209 is controlled so that the front curtain opens. In step S216, the image data controller 220 is instructed to carry out the operations for charge accumulation in the image sensor 210. The exposure of the image sensor 210 is started as a result. In step S217, the apparatus stands by for the accumulation time determined in step S210. Once that accumulation time ends, the process moves to step S218, where the focal plane shutter 209 is controlled to close the rear curtain. The exposure of the image sensor 210 ends as a result.

In step S219, the quick-return mirror 202 is driven downward. In step S220, the focal plane shutter 209 is driven for charging. In step S221, the aperture 102 is driven to be open. In step S222, the image data controller 220 is instructed to obtain the image data from the image sensor 210. In step S223, the read-out image data is recorded into the image data recording medium 218 through the image compression circuit 219, and the operations of the flowchart end.

Figure 6:
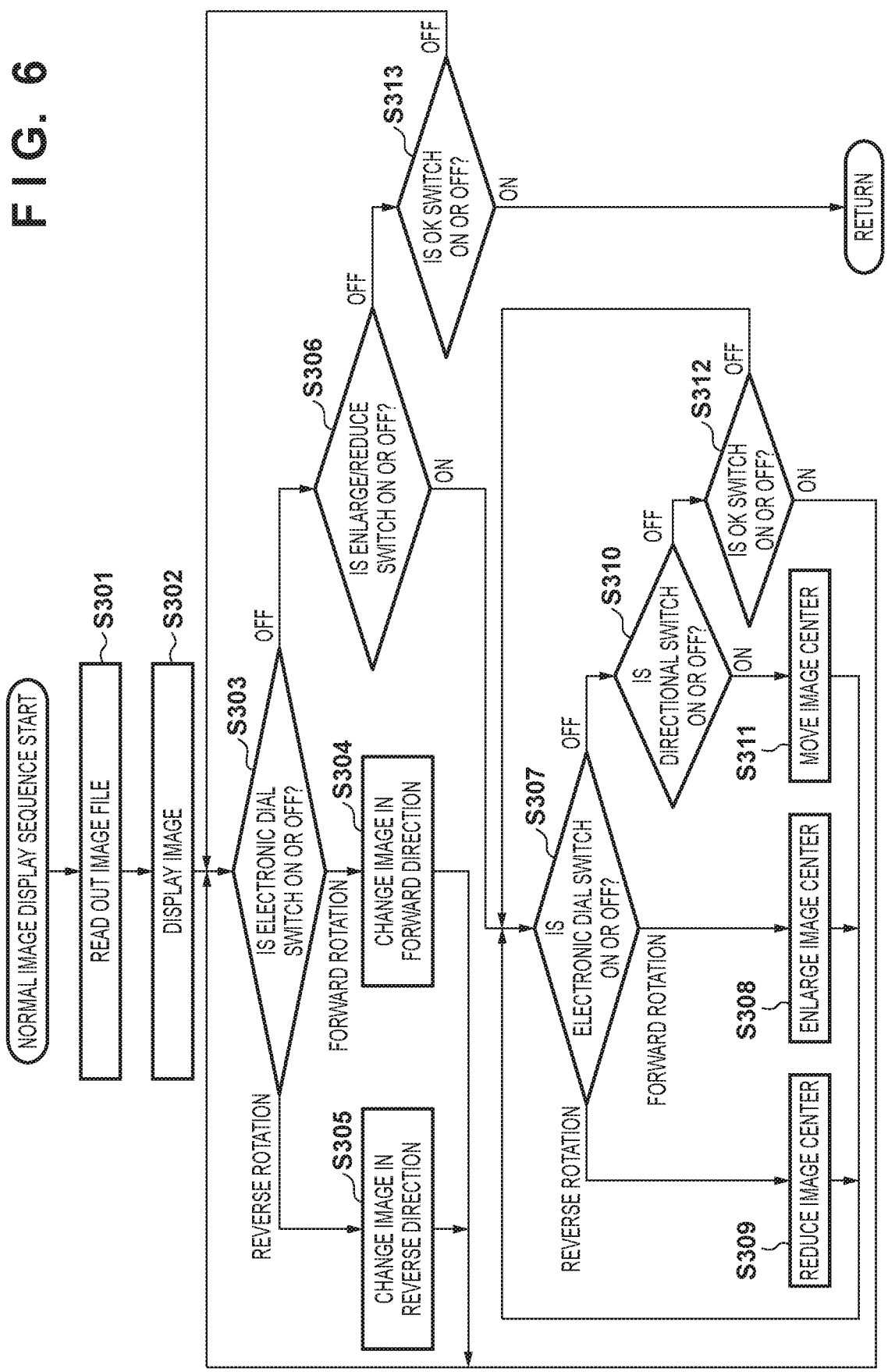
FIG. 6 is a flowchart illustrating a normal image display sequence carried out by the image capturing apparatus according to the first embodiment.

FIG. 6 is a flowchart illustrating operations in the normal image display sequence carried out by the camera 200 according to the present embodiment.

In step S301, an image file stored in the image data recording medium 218 is read out. If a plurality of image files are saved in the image data recording medium 218, the image file that was captured most recently is read out.

Figure 7A:
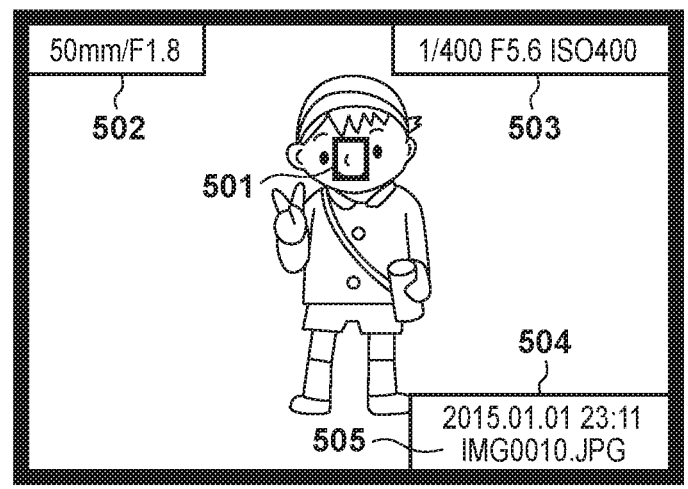
FIGS. 7A to 7C are diagrams illustrating images displayed in a display apparatus in the normal image display sequence carried out by the image capturing apparatus according to the first embodiment.
Figure 7B:
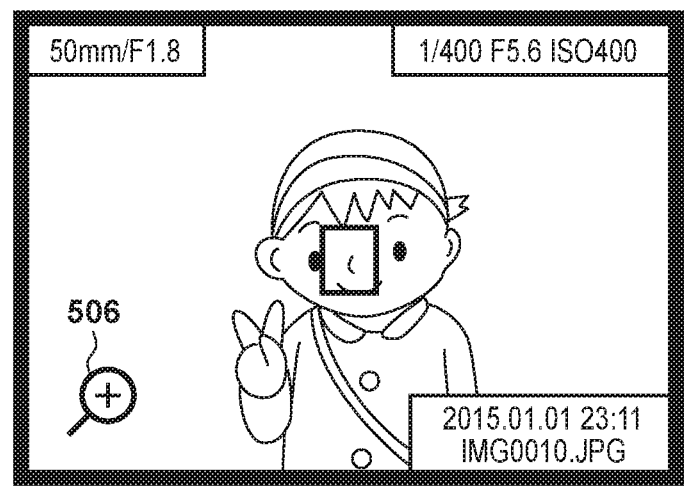
Figure 7C:
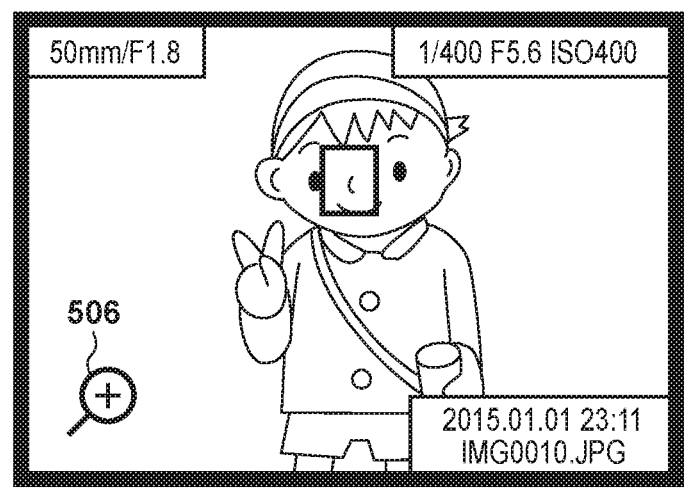

In step S302, the read-out image file is displayed in the display apparatus 213. FIGS. 7A to 7C are diagrams illustrating the image displayed in the display apparatus 213 in the normal image display sequence. The image displayed first is the image illustrated in FIG. 7A. In FIG. 7A, 501 indicates the focus detection area that has been used. 502 indicates information pertaining to the imaging lens. In this diagram, the image was captured using an imaging lens having a focal length of 50 mm and a maximum aperture of f/1.8. 503 indicates information of the image capture conditions. From the left, the numerical values indicate the shutter speed, the F-stop number of the imaging lens, and ISO sensitivity, respectively. 504 indicates information of the date/time at which the image was captured. 505 indicates the name of the image file. With the camera 200 according to the present embodiment, image names (image numbers) are assigned to the captured images in order from 0001. As such, this image is the tenth image that has been captured, counting from 0001.

After step S302, the apparatus is in a state of accepting an operation of the operation member. In step S303, it is determined whether or not the electronic dial switch 238 has been operated. The electronic dial switch 238 is a rotational dial, and can be rotated both forward and in reverse. As such, the processing branches depending on the rotation direction.

Step S304 is a process carried out when the electronic dial switch 238 has been rotated forward, and the image that is displayed is switched in the forward direction. In the example in FIG. 7A. 0010 indicates the final image, and thus the display loops back to the first image 0001.

Step S305 is a process carried out when the electronic dial switch 238 has been rotated backward, and the image that is displayed is switched in the reverse direction. In the example in FIG. 7A, image 0009, which is one previous to the image 0010, is displayed.

In this manner, a process for scrolling through the images is executed when the electronic dial switch 238 is operated. Once step S304 and step S305 are complete, the process returns to step S303, and the apparatus again enters a state of accepting an operation of the operation member.

On the other hand, if the electronic dial switch 238 is off in step S303, the process moves to step S306, where it is determined whether or not the enlarge/reduce switch 239 has been operated. If the switch has been operated, the process moves to step S307, whereas if the switch has not been operated, the process moves to step S313.

In step S307, it is determined whether the electronic dial switch 238 has been operated. The processing branches depending on the direction in which the electronic dial switch 238 has been rotated. Step S308 is a process carried out when the electronic dial switch 238 has been rotated forward, and the image that is displayed is enlarged. The enlargement of the display is carried out central to the focus detection area position 501. FIG. 7B is a diagram illustrating a state in which the image has been enlarged from the state illustrated in FIG. 7A. In FIG. 7B, 506 is an icon indicating that the display has been enlarged.

Step S309 is a process carried out when the electronic dial switch 238 has been rotated backward, and the image that is displayed is reduced. Like in step S308, the reduction of the display is carried out central to the focus detection area position 501. For example, if the reduction is carried out from a state in which the image is displayed as indicated in FIG. 7B, the image will be displayed as indicated in FIG. 7A. If the electronic dial switch 238 is rotated further backward from the state illustrated in FIG. 7A, the display transitions to thumbnails of the captured images.

On the other hand, if the electronic dial switch 238 is off in step S307, the process moves to step S310. In step S310, it is determined whether or not the directional switch 236 has been operated. If the directional switch 236 has been operated, the process moves to step S311, whereas if the directional switch 236 has not been operated, the process moves to step S312.

In step S311, the central position of the image display is moved in accordance with the direction in which the directional switch 236 has been operated. Inputs can be made in four directions using the directional switch 236, and the center of the image is moved in the input direction. FIG. 7C illustrates an image displayed when the downward direction has been input through the directional switch 236 in the state illustrated in FIG. 7B.

After the processes of steps S308, S309, and S311 are complete, the process returns to step S307, and the apparatus once again enters a state of excepting an operation from the user. Repeating the operations of the electronic dial switch 238 and the directional switch 236 in this manner make it possible to enlarge and reduce a desired position in the captured image.

If the OK switch 237 is operated in step S312, the enlargement/reduction is assumed to be complete, and the process returns to step S303. If the OK switch 237 has not been operated, the process returns to step S307, where the apparatus enters a state of accepting an operation of the operation member.

If the OK switch 237 is operated in step S313, the image playback is ended. If the OK switch 237 has not been operated, the process returns to step S303, where the apparatus enters a state of accepting an operation of the operation member.

As described above, the camera 200 according to the present embodiment can set an AF correction amount for correcting skew in the in-focus position for each imaging lens. The "AF calibration mode" is a mode for appropriately setting this AF correction amount.

In the AF calibration mode, what is known as "focus bracketing" is carried out, where a given position is taken as a reference, and image capture control is then carried out to capture a plurality of images while driving the focus lens 101 (the focus position) by minute amounts (predetermined amounts) forward and backward from the reference position (S8). When carrying out focus bracketing, the defocus amounts used when capturing the images are associated with the corresponding captured images. Then, the user selects the image, of the images obtained through the focus bracketing, determined to have the best focus state (S9). Upon doing so, a difference between the defocus amount associated with the image selected by the user and a reference defocus amount determined initially is set as the AF correction amount.

Figure 8A:
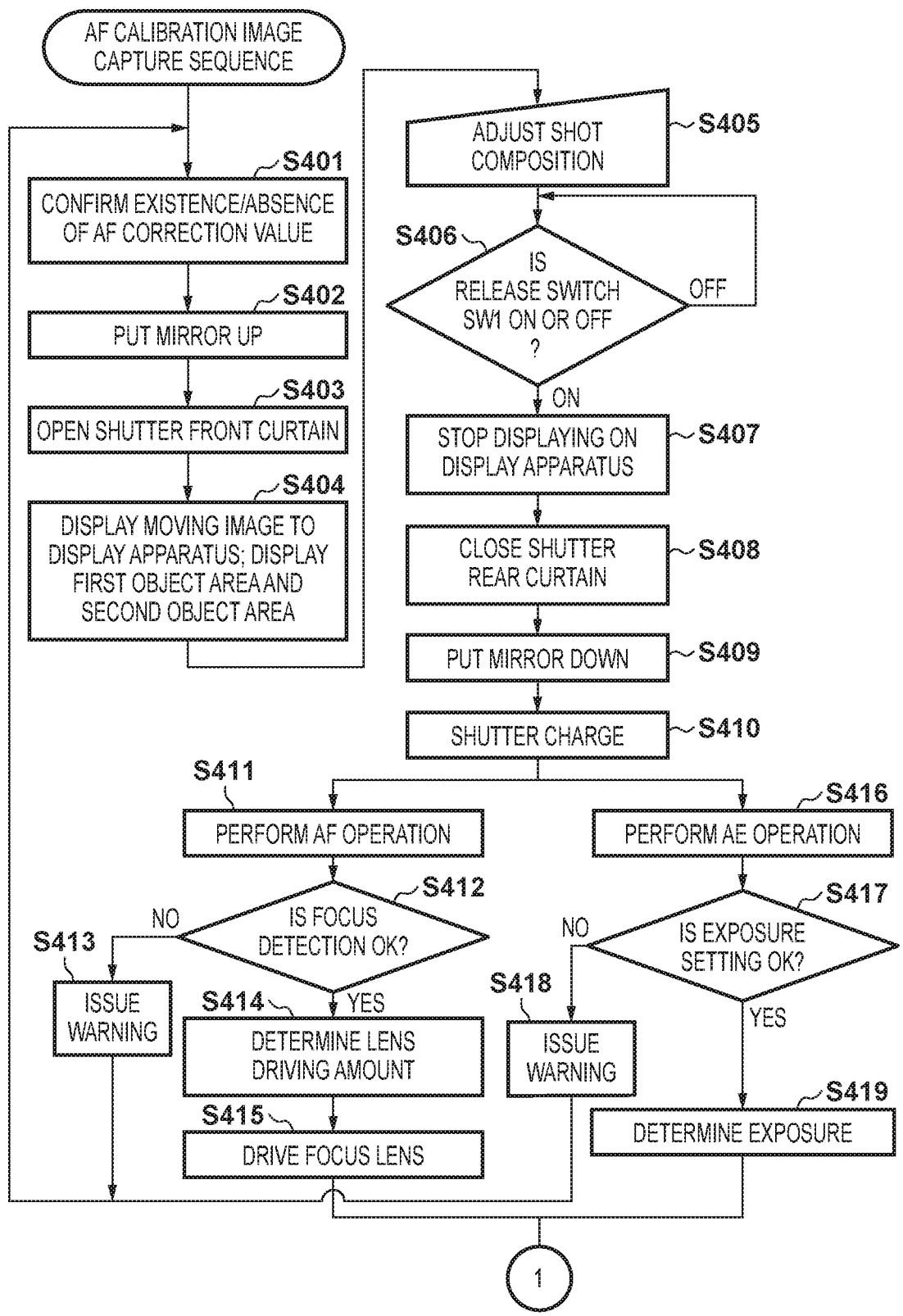
FIGS. 8A and 8B are flowcharts illustrating an AF calibration image capture sequence carried out by the image capturing apparatus according to the first embodiment.
Figure 8B:
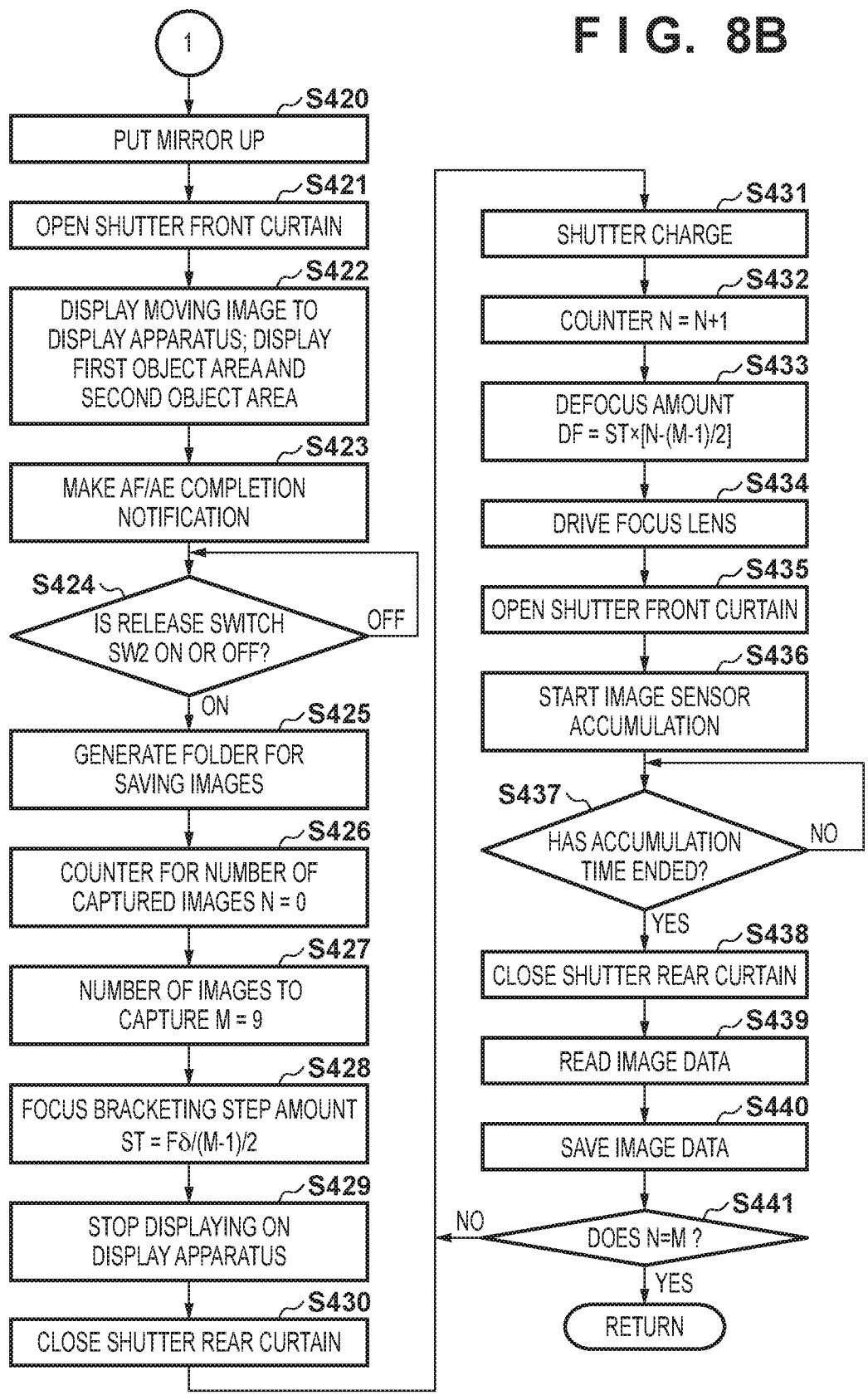

FIGS. 8A and 8B are flowcharts illustrating operations in an AF calibration image capture sequence according to the present embodiment.

In step S401, it is confirmed whether or not the AF correction amount corresponding to the mounted imaging lens is stored in the camera information memory 222. In step S402, the quick-return mirror 202 is driven upward. In step S403, the focal plane shutter 209 is controlled so that the front curtain opens. As a result, an object image is formed on the image sensor 210. In step S404, the object image that has been formed is converted into an image signal by the image sensor 210, and is displayed as a moving image in the display apparatus 213 (this is known as a "live view display").

Figure 9:
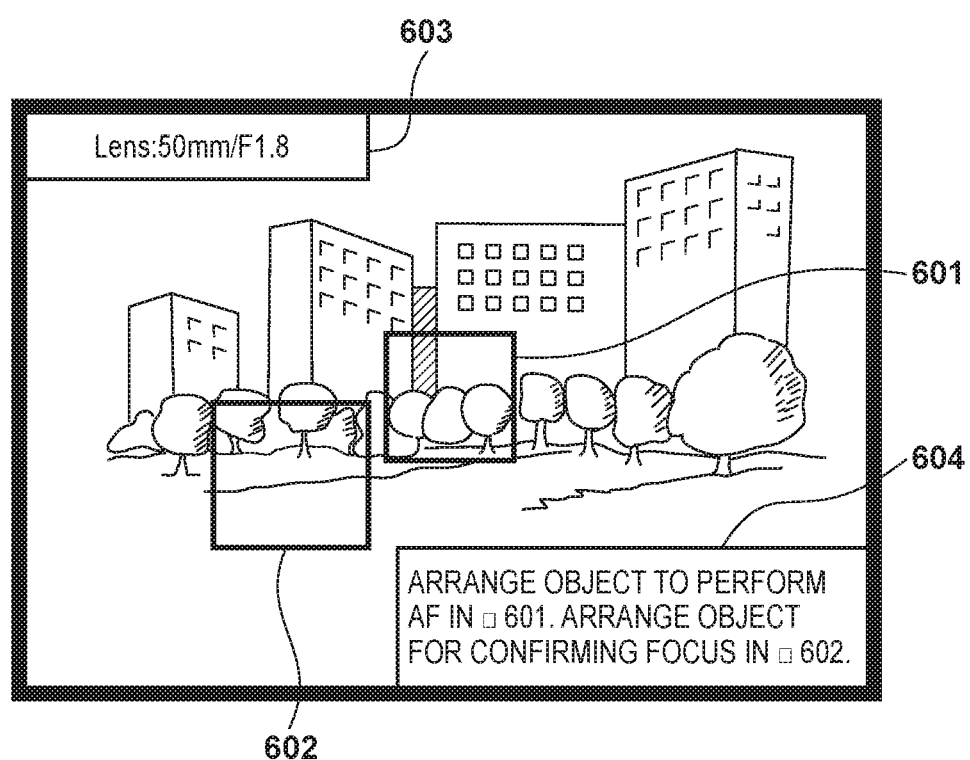
FIG. 9 is a diagram illustrating an image displayed in the display apparatus before the AF calibration image capture carried out by the image capturing apparatus according to the first embodiment.

FIG. 9 is a diagram illustrating the image displayed in the display apparatus 213 before the AF calibration image capture. A frame (guide frame) 601 located in the center represents a first object area. The first object area 601 indicates an area for focus detection by the AF unit 204. The other frame (guide frame) 602 in the periphery of the first object area 601 represents a second object area. The second object area 602 is an area for arranging an object favorable for use in determining the in-focus position of the image when selecting an AF calibration image. Although the first object area 601 and the second object area 602 are indicated as black frames in FIG. 9, the frames are actually colored, and are displayed using different colors to make it easier to identify the respective areas.

603 in the upper-left part of the screen indicates information pertaining to the imaging lens. Here, this indicates that an imaging lens having a focal length of 50 mm and a maximum aperture of f/1.8 is mounted. 604 in the lower-right part of the screen indicates a guidance display part. This is an area where guidance is displayed to enable the user to select an object favorable for use in the AF calibration image capture. Note that the content and meaning of the guidance display will be described later.

In step S405, in accordance with the guidance, the user adjusts the composition so that a flat object is arranged in the first object area 601 that is displayed, and an object exhibiting depth is arranged in the second object area 602. Here, it is assumed that an image is captured using the composition illustrated in FIG. 9.

In step S406, it is detected whether or not the release switch SW1 (231) has been operated. If the release switch SW1 has been operated, the process moves to step S407, whereas if the switch has not been operated, the apparatus stands by.

In step S407, the moving image display in the display apparatus 213 is ended, and the charge accumulation in the image sensor 210 is stopped as well. In step S408, the focal plane shutter 209 is controlled so that the rear curtain closes. In step S409, the quick-return mirror 202 is driven downward. In step S410, the focal plane shutter 209 is driven for charging. Because the quick-return mirror 202 is down as a result of the operations carried out up to this point, the AF unit 204 and the AE unit 207 can carry out focus detection and photometry.

In step S411, the AF unit 204 carries out focus detection in the first object area 601. In step S412, it is determined whether or not the focus detection was successful. If the focus detection was not successful, the process moves to step S413, where a warning is issued. The warning is issued through a method such as displaying an error message in the in-viewfinder information display apparatus 208, causing the buzzer 240 to emit an alarm sound, or the like. If the focus detection was successful, the process moves to step S414.

In step S414, an amount by which the focus lens 101 is to be driven is determined on the basis of the focus detection result (the defocus amount). Unlike the normal image capture sequence, even if an AF correction amount is stored, that AF correction amount is not used when calculating the lens driving amount. This is because the AF calibration mode is a mode for setting the AF correction amount.

In step S415, the determined lens driving amount is sent to the lens control circuit 104, and the lens control circuit 104 converts data of the received lens driving amount into a number of drive pulses to be supplied to the stepping motor of the lens driving mechanism 103. The stepping motor is driven, and the focus lens 101 is moved, on the basis of this number.

In step S416, the object image formed on the focusing screen 205 through the imaging lens 100 is subjected to photometry by the AE unit 207. As described earlier, an exposure setting value prioritizing the vicinity of the selected focus detection area is calculated in accordance with the output of the AE unit 207. Specifically, the charge accumulation time of the image sensor 210 (shutter speed) and the gain of the image sensor 210 (ISO sensitivity) are determined. Unlike the normal image capture sequence, the aperture is open when setting the exposure in the AF calibration mode. This is because a lower F-stop number for the imaging lens produces a shallower focal depth in the captured image, and makes it easier to confirm the focus state of the image.

In step S417, it is determined whether or not the exposure setting was successful. If the exposure setting was not successful, the process moves to step S418, where a warning is issued. The warning is issued through a method such as displaying an error message in the in-viewfinder information display apparatus 208, causing the buzzer 240 to emit an alarm sound, or the like.

If the exposure setting was carried out successfully in step S417, the process moves to step S419, where the exposure is determined. The exposure conditions determined in step S419 are stored within the system controller 223. In step S420, the quick-return mirror 202 is driven upward. In step S421, the focal plane shutter 209 is controlled so that the front curtain opens.

In step S422, the object image is converted into an image signal by the image sensor 210 and is displayed as a moving image in the display apparatus 213. At the same time, the first object area 601 and the second object area 602 are displayed.

In step S423, the user is notified that the focus adjustment and exposure setting are complete. Specifically, the notification is carried out through a method such as displaying an indication that the focus adjustment is complete and preparations for AF calibration image capture are complete in the display apparatus 213, causing the buzzer 240 to emit a sound, or the like.

In step S424, it is detected whether or not the release switch SW2 (232) has been operated. If the release switch SW2 (232) has been operated, the process moves to step S425, whereas if the switch has not been operated, the apparatus stands by. When the release switch SW2 (232) has been operated, focus bracketing is started.

In step S425, a folder for temporarily saving the images generated by focus bracketing is created in the image data recording medium 218. This is a process for preventing the images captured through focus bracketing from intermixing with other captured images in the same folder, in the case where such images are already recorded in the image data recording medium 218.

In step S426, a default value is set for a counter "N" of the number of captured images. The default value is N=0. In step S427, a number of images "M" to be obtained through the focus bracketing is set. In the present embodiment, M=9.

In step S428, a focus bracketing step amount "ST" is determined. The focus bracketing step amount is an interval of defocus amounts used during the focus bracketing. In the present embodiment, the focus bracketing step amount ST is determined through the following expression.

$$ST=F\times\delta/[(M-1)/2]$$

Here, F represents the maximum aperture of the imaging lens 100, and δ represents the diameter of the permissible circle of confusion of the imaging lens 100. In other words, F×δ is equivalent to the focal depth when the imaging lens 100 captures an image with the aperture open. Note that F and δ are stored in the lens information memory 107 within the imaging lens 100, and are substituted by being read out by the system controller 223. The focus bracketing step amount ST corresponds to an equal division within in a range of Fδ from the center of the captured image number M, obtained by dividing by (M−1)/2.

In step S429, the moving image display in the display apparatus 213 is ended, and the charge accumulation in the image sensor 210 is stopped as well. In step S430, the focal plane shutter 209 is controlled so that the rear curtain closes. In step S431, the focal plane shutter 209 is driven for charging. In step S432, the counter N is increased by 1 (is counted up).

In step S433, a defocus amount DF is determined for driving the focus lens 101. Because ST is determined in step S428, the defocus amount DF is found as follows:

$$DF=ST\times[N-(M-1)/2]$$

In the present embodiment, M=9, and thus an image captured at the focus lens position where DF=0 (when the defocus amount is a reference value), four images captured when DF is negative, and four images captured when DF is positive, are captured in the focus bracketing.

In step S434, a movement amount by which the focus lens 101 is to be driven is calculated from the defocus amount DF computed in step S433. This is sent to the lens control circuit 104, and the lens control circuit 104 converts data of the received lens driving amount into a number of drive pulses to be supplied to the stepping motor of the lens driving mechanism 103. The stepping motor is driven, and the focus lens 101 is moved, on the basis of this number.

In step S435, the focal plane shutter 209 is controlled so that the front curtain opens. In step S436, the image data controller 220 is instructed to carry out the operations for charge accumulation in the image sensor 210. The exposure of the image sensor 210 is started as a result. In step S437, the apparatus stands by for the accumulation time determined in step S419. Once that accumulation time ends, the process moves to step S438, where the focal plane shutter 209 is controlled to close the rear curtain. The exposure of the image sensor 210 ends as a result.

In step S439, the image data controller 220 is instructed to obtain the image data from the image sensor 210. In step S440, the read-out image data is recorded into the image data recording medium 218 through the image compression circuit 219. The image data is recorded in the dedicated folder created in step S425. Information indicating the defocus amount DF, the value of the counter N, the position of the first object area 601, and the position of the second object area 602 at the point in time when the image was captured is also saved in association with the image data.

In step S441, the values of the counter N and the captured image number M are compared. If the counter N and the captured image number M are the same, the AF calibration image capture sequence ends. However, if the counter N and the captured image number M are not the same, the process returns to step S431 and continues from there. The image capturing is thus repeated until the counter N reaches the set captured image number M.

Figure 10:
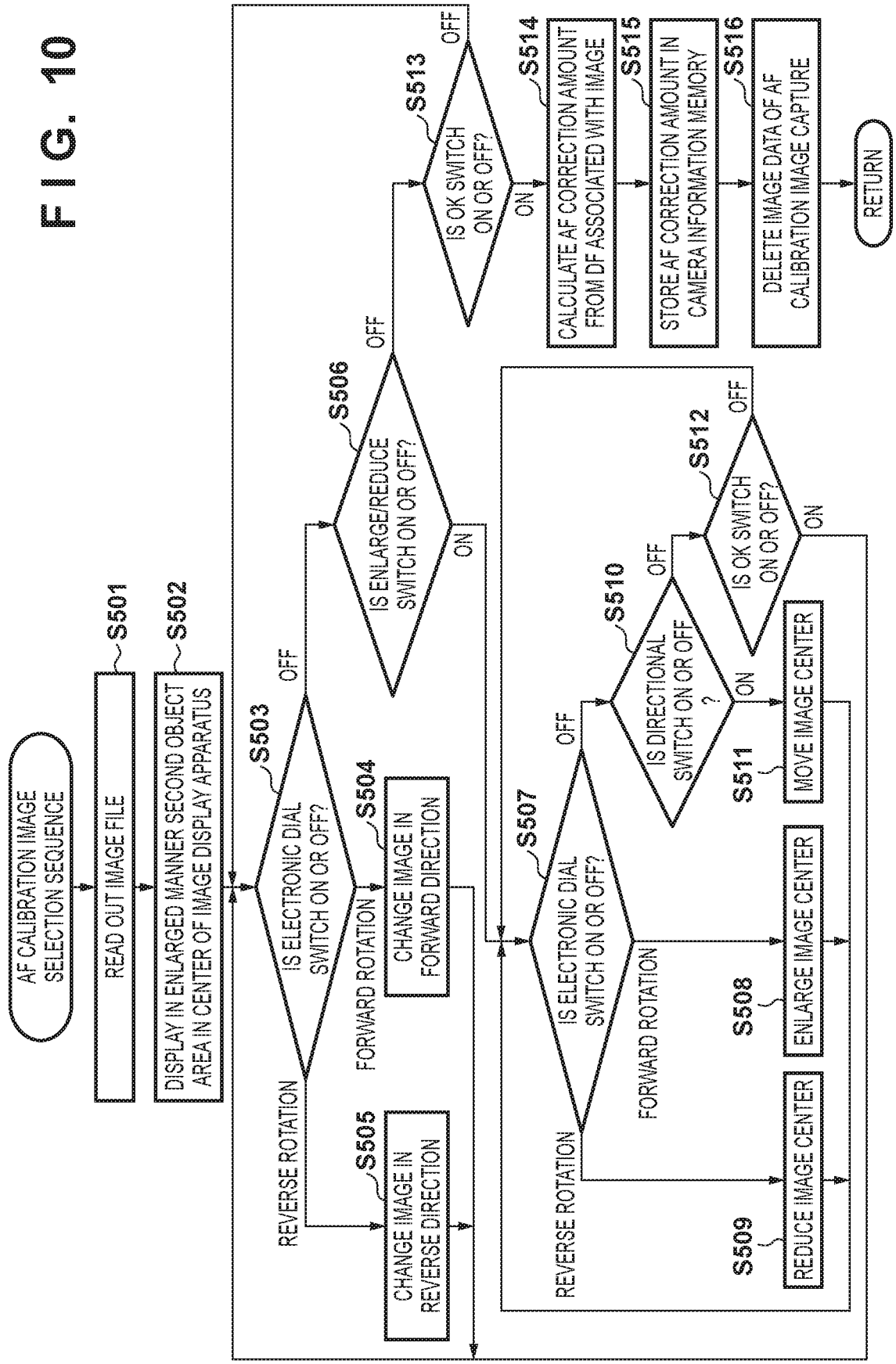
FIG. 10 is a flowchart illustrating an AF calibration image selection sequence carried out by the image capturing apparatus according to the first embodiment.

Once the AF calibration image capture sequence described above ends, the process then moves to an AF calibration image selection sequence (S9). FIG. 10 is a flowchart illustrating operations of the AF calibration image selection sequence according to the present embodiment.

In step S501, image data captured in the AF calibration image capture sequence, and having a counter value of "1", is read out from the image data recording medium 218 to the image data controller 220.

In step S502, the image read out in step S501 is displayed in the display apparatus 213. Here, when displaying the image data in the AF calibration image selection sequence, a region containing the second object area set in step S405 is displayed in an enlarged manner, unlike the image display carried out in the normal image display sequence.

Figure 11:
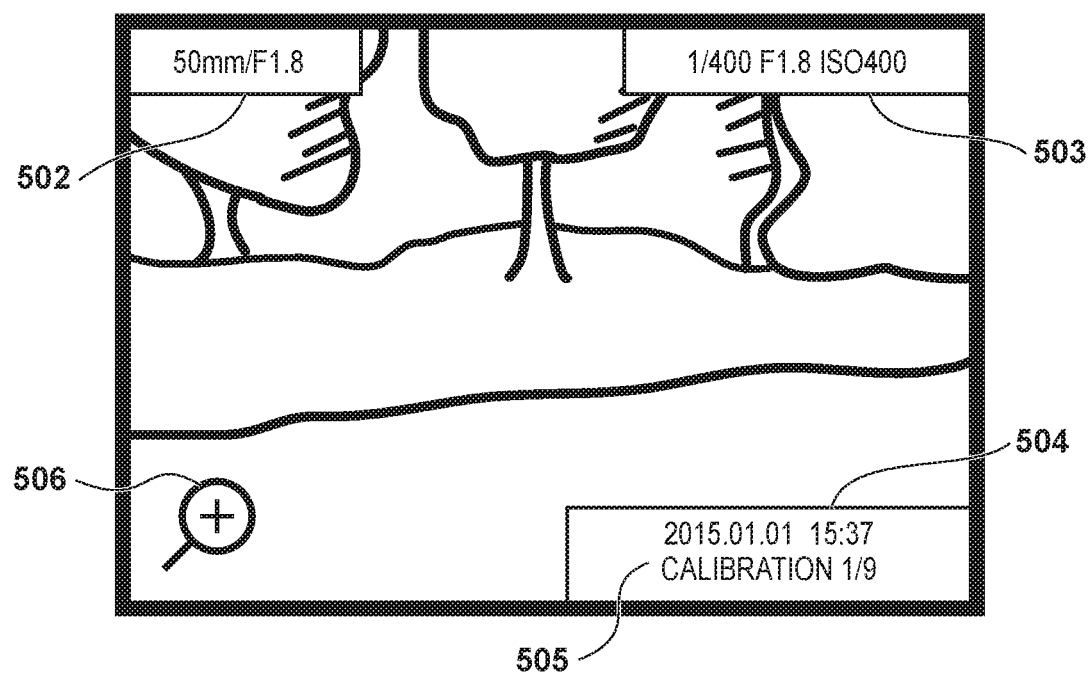
FIG. 11 is a diagram illustrating an image displayed in the display apparatus in the AF calibration image selection sequence carried out by the image capturing apparatus according to the first embodiment.

FIG. 11 is a diagram illustrating the image displayed in the display apparatus 213 in the AF calibration image selection sequence. The entire second object area 602 is displayed in an enlarged manner. The processing of steps S503 to S512 that follow thereafter is the same as the processing of steps S303 to S312 in the normal image display sequence, and thus descriptions thereof will be omitted. Steps S503 to S512 correspond to operations for scrolling forward and backward through the images, and enlarging or reducing the images. The user selects the image in which the object is most in focus (an in-focus image) from the images captured in the bracketing while repeating these processes.

If the OK switch 237 is operated in step S513, the process moves to step S514. The processing proceeds assuming that the image displayed at this time is the image selected as the in-focus image by the user.

In step S514, the defocus amount DF associated with the in-focus image is read out. The defocus amount associated with the in-focus image corresponds to a difference from the position determined to be in focus by the AF unit 204 (the position where the defocus amount DF is 0), that is, the AF correction amount.

In step S515, the AF correction amount found from the in-focus image is stored in the camera information memory 222 or the lens information memory 107. Information of the imaging lens 100 is also associated with the AF correction amount stored here. In step S516, the data from the AF calibration image capturing, which had been saved in the image data recording medium 218, is deleted.

Features of the AF calibration mode according to the present embodiment, and the effects achieved thereby, will be described hereinafter.

Aside from the secondary image-forming phase difference detection method described in the present embodiment, image capturing plane phase difference detection and contrast peak detection can also be given as examples of AF systems provided in an image capturing apparatus. With such AF systems, it is desirable that the object for focus detection be at a constant distance in the optical axis direction (that is, flat) within the range in which the focus detection is carried out. This is because error may arise in the focus detection if there is a difference in distances with respect to the optical axis direction within the range for focus detection (this is known as "perspective conflict"). It is also necessary for the object to have a brightness difference within the range for focus detection (i.e., to have a high contrast). This is because all of the aforementioned AF systems use photoelectric conversion elements, and an object having a brightness difference therefore has a better S/N ratio. For the reasons mentioned above, a flat object that has a brightness difference is arranged in the first object area 601 corresponding to the AF focus detection range.

Meanwhile, consider a case where the focus state is determined from a captured image. Normally, when the user views an image captured of a flat object to determine whether or not the image is in focus, the user often makes the determination by checking the state of blur in a part of the object where there is a brightness difference (edge parts of the image). However, this method for determining the state of focus is not preferable as a method for selecting an image in the AF calibration mode. The reason for this is that the imaging lens has a high focal depth with respect to the range of the AF in-focus position adjusted in the AF calibration mode, and as a result, inconsistencies arise when the user selects the image that is in focus.

Shifts in the focus caused by manufacturing error in the imaging lens are to be corrected by the AF calibration, and such shifts are on the magnitude of several tens of m. As opposed to this, the permissible circle of confusion diameter δ of the imaging lens is approximately 10 to 30 μm. If, for example, the permissible circle of confusion diameter is 10 μm and the maximum aperture of the imaging lens is 2.0, the focal depth Fδ will be 20 μm. In this case, if an attempt is made to correct the manufacturing error in the imaging lens through AF calibration, the focus bracketing step ST will be 5 μm. Several of the images captured in the focus bracketing will therefore have in-focus positions within the focal depth. If the in-focus position is within the focal depth, the image generally appears to be in focus.

However, AF calibration is also a function for users who demand extremely high focus accuracy, such as where the focus accuracy is further increased within the focal depth. It is therefore necessary to select a single image, among the plurality of images in which the in-focus position is within the focal depth, that has the best in-focus position.

In the present embodiment, to solve the above-described problem, the second object area 602 is provided, and guidance is given so that an object exhibiting depth is placed within that region when capturing an image in the AF calibration mode. Here, an "object exhibiting depth" refers to an object that is not parallel to the flat object subjected to the AF focus detection. An object exhibiting depth in the forward/backward direction from the flat object with respect to the imaging optical axis is particularly favorable as this object.

Figure 12A:
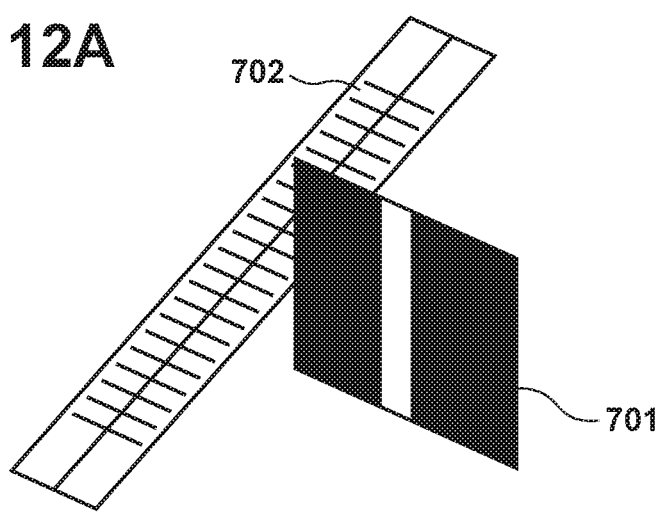
FIGS. 12A and 12B are diagrams illustrating the state of a flat object and a three-dimensional object favorable for AF calibration image capture.
Figure 12B:
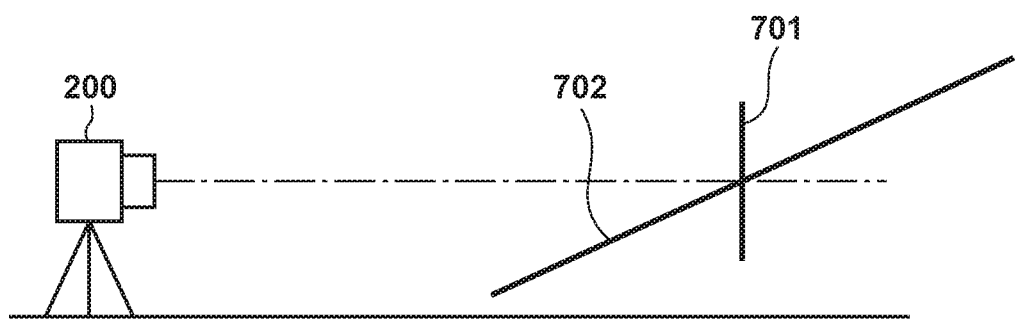

FIGS. 12A and 12B are diagrams illustrating conceptual forms of a flat object and a three-dimensional object favorable for use in the AF calibration image capturing according to the present embodiment. FIG. 12A is a perspective view of the objects, and FIG. 12B is a diagram illustrating positional relationships with an image capturing apparatus 1.

A flat chart 701 is present in the image capturing optical axis of the camera 200. The flat chart 701 is arranged so as to be perpendicular to the image capturing optical axis. Additionally, the flat chart 701 has a high-contrast pattern (a pattern of black and white). On the other hand, 702 indicates an angled chart. The angled chart 702 is arranged so as to be angled relative to the image capturing optical axis, to the front and rear of the flat chart 701. Additionally, marks are provided in the angled chart 702 at equal intervals as a pattern.

Figure 13A:
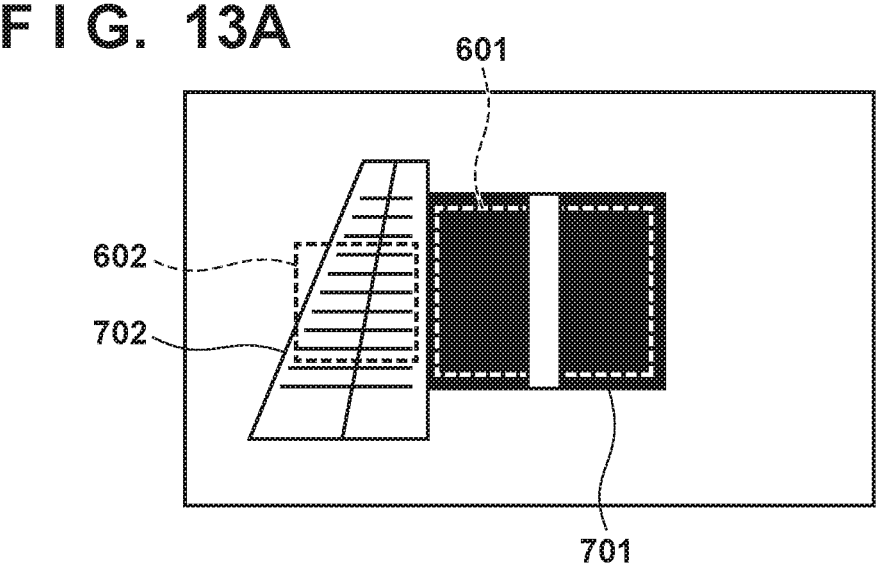
FIG. 13A is a diagram illustrating an image obtained as a result of the AF calibration image capture carried out by the image capturing apparatus according to the first embodiment.
Figure 13B:
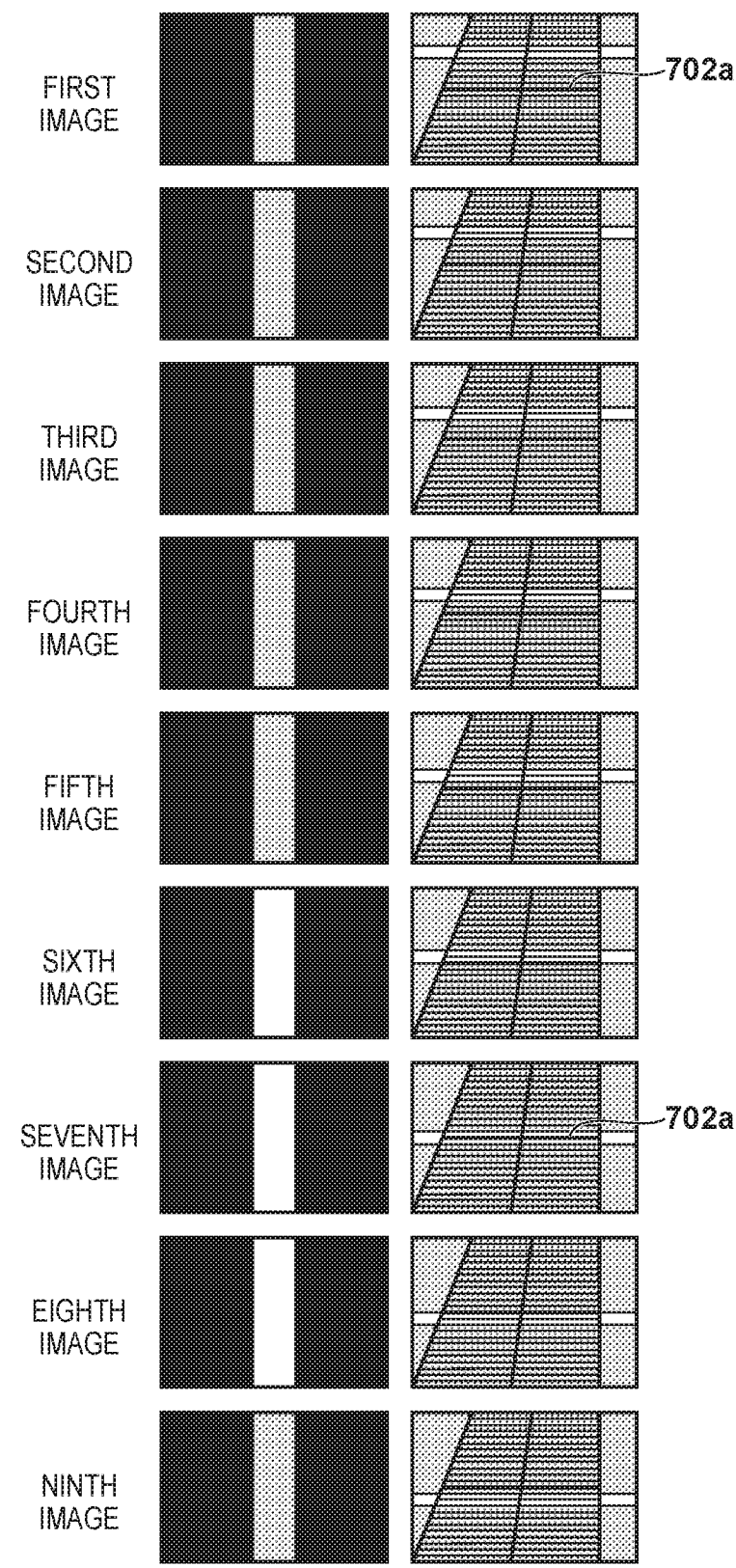
FIG. 13B is a diagram illustrating an image obtained as a result of the AF calibration image capture carried out by the image capturing apparatus according to the first embodiment.

FIGS. 13A and 13B are diagrams illustrating images obtained as a result of carrying out focus bracketing using the objects illustrated in FIGS. 12A and 12B.

FIG. 13A illustrates the image as a whole. The white broken line over the flat chart 701 represents the first object area 601, and the broken line over the angled chart 702 represents the second object area 602. FIG. 13B is a diagram illustrating the parts in FIG. 13A corresponding to the first object area 601 and the second object area 602 in an enlarged manner, and illustrates nine images obtained through the AF calibration image capturing.

A bold line 702a indicates the mark on the angled chart 702 that is located at the same distance as the flat chart 701. The hatched parts indicate ranges that are not in focus. Although these parts are indicated by hatching in the diagrams, the corresponding ranges are blurry areas in the actual images. As described above, images are continuously captured while driving the focus lens 101 at equal steps during the AF calibration image capturing.

If an attempt is made to select the in-focus image from the images indicated in FIG. 13B, the flat chart 701 will appear to be in focus in the sixth to eighth images. It is difficult for the user to determine the image, among these images, that has the best focus state. However, if an object angled relative to the optical axis, such as the angled chart 702, is subjected to the focus bracketing, sequential images are obtained in which the in-focus position gradually moves. From this, it can be seen that there is an image in which the range where the image appears to be in focus in the angled chart 702 matches the bold line 702a at essentially the same position in the flat chart (the seventh image). This corresponds to the in-focus image.

In this manner, a clear reference for selecting the in-focus image is obtained by capturing an image of an object such as the angled chart 702. For this reason, checking the angled chart 702 and selecting an image in which the angled chart 702 is in focus at the same position as the flat chart 701 makes it more difficult for inconsistencies to arise in the selection of the in-focus image than when selecting the image by checking only the flat chart 701.

Note that the bold line 702a in the angled chart indicates a location at the same distance of the flat chart 701 in the image, and thus it is not necessary for the mark at the same distance as the flat chart 701 to have a form different from the other marks. For example, even if all the marks have the same shape, the location on the angled chart 702 at the same distance as the flat chart 701 can be found as long as the flat chart 701 can be seen in the image.

Although the foregoing has described effects for a case where ideal charts, such as those described with reference to FIGS. 12A and 12B, have been captured, the objects that are used are not limited to these charts. For example, using a sign, a wall, or the like instead of the flat chart 701, and a road, a ceiling, or the like instead of the angled chart 702, makes it possible to execute the AF calibration in a wide variety of image capturing scenes.

In the present embodiment, the first object area 601 and the second object area 602 are provided, and the user is prompted to arrange the objects as indicated in FIGS. 12A and 12B in those areas, before the focus bracketing is carried out. Then, when the user selects an image, the range containing the second object area 602 is displayed in an enlarged manner.

An object exhibiting depth, such as the angled chart 702, is arranged in the second object area 602 as a result. Additionally, when selecting the AF calibration image, the user selects the in-focus image while checking the focus of the object in the second object area 602, rather than the object in the first object area 601, which is normally difficult for the user to see.

According to the first embodiment of the present invention as described thus far, an image capturing apparatus capable of highly-accurate AF calibration, in which the user can appropriately select an in-focus image, can be provided.

Although the first embodiment describes displaying the range containing the second object area 602 in an enlarged manner during the image selection in the AF calibration mode, the first object area 601 present in the vicinity thereof may be displayed as well in an enlarged manner. Alternatively, the second object area 602 and the first object area 601 may be displayed individually in an enlarged manner.

As a result, the focus in the first object area 601 can be confirmed at the same time, while viewing the second object area 602. This display method is used in a case where the second object area 602 does not have a mark indicating the same distance as the first object area 601 (the bold line 702a), and the first object area 601 is viewed instead of using the stated mark.

Second Embodiment

A second embodiment of the present invention will be described next. Note that the configuration of the image capturing apparatus according to the second embodiment is the same as the configuration according to the first embodiment unless indicated otherwise. As such, the corresponding constituent elements, operation flowcharts, and the like will not be described.

FIG. 14 is a flowchart illustrating operations in an AF calibration image selection sequence carried out by the camera 200 according to the second embodiment.

The difference from the first embodiment is the process of step S502a. In the first embodiment, the area of the images captured through bracketing that contains the second object area 602 is displayed in an enlarged manner; however, in the second embodiment, areas outside the range containing the second object area 602 are displayed with hatching.

Figure 15:
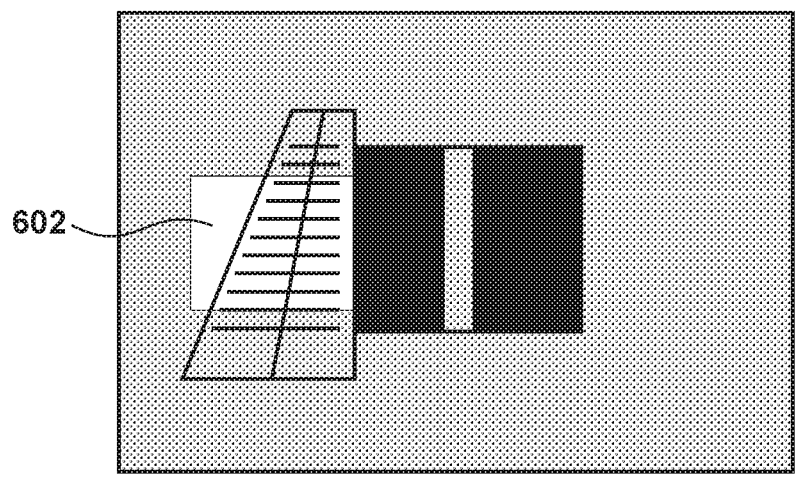
FIG. 15 is a diagram illustrating an image obtained as a result of AF calibration image capture carried out by the image capturing apparatus according to the second embodiment.

FIG. 15 is a diagram illustrating an image obtained as a result of subjecting the objects illustrated in FIGS. 12A and 12B to AF calibration image capturing carried out by the camera 200 according to the second embodiment. In this manner, the user is prompted to focus on the second object area 602 by using hatching to make the areas aside from the second object area 602 less visible.

According to the second embodiment as described thus far, an image capturing apparatus capable of highly-accurate AF calibration, in which the user can appropriately select an in-focus image, can be provided, in the same manner as the first embodiment.

Third Embodiment

A third embodiment of the present invention will be described next. Note that the configuration of the image capturing apparatus according to the third embodiment is the same as the configuration according to the first embodiment unless indicated otherwise. As such, the corresponding constituent elements, operation flowcharts, and the like will not be described.

Figure 16:
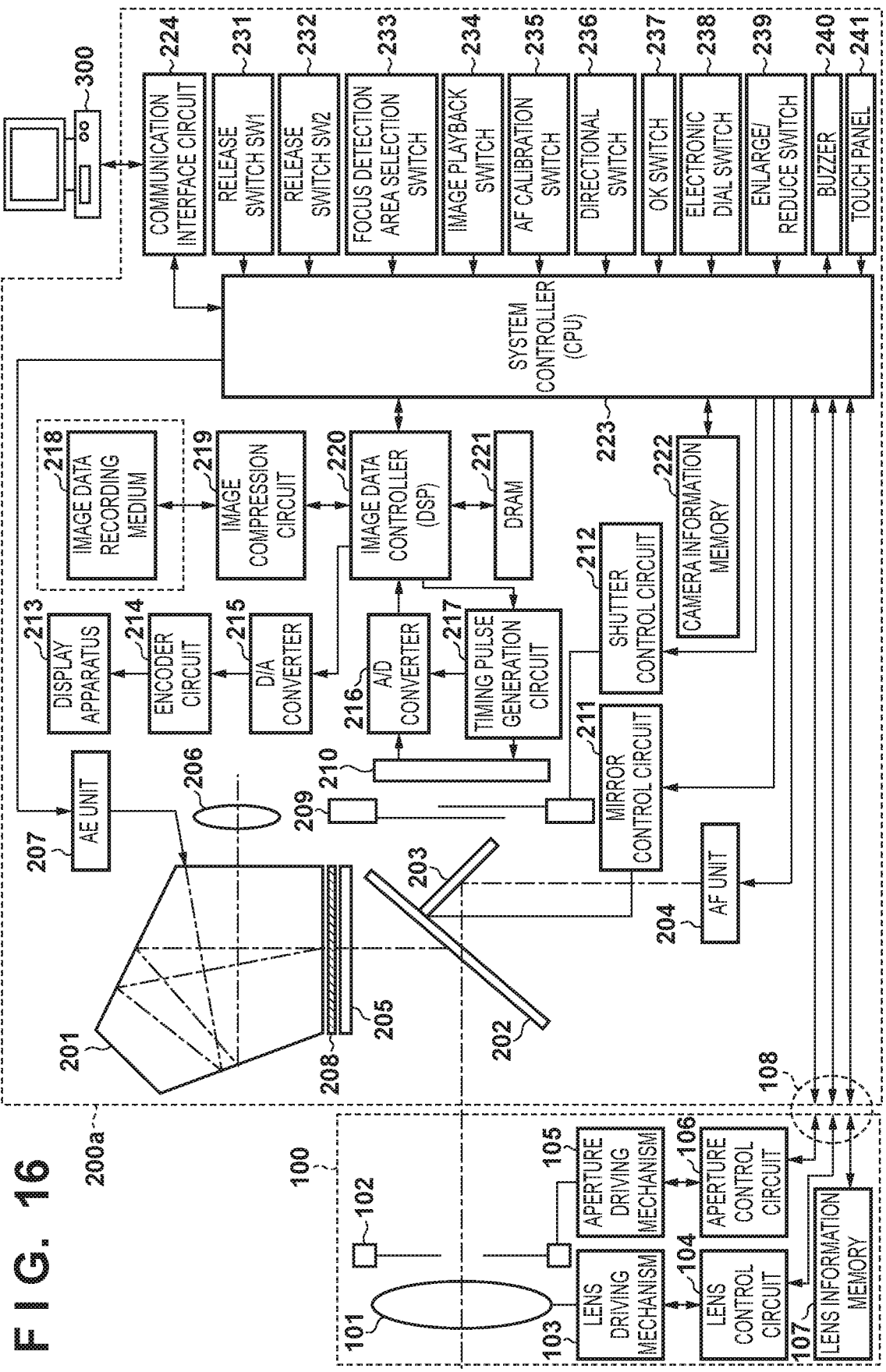
FIG. 16 is a block diagram illustrating the configuration of an image capturing apparatus according to a third embodiment.

FIG. 16 is a block diagram illustrating the configuration of a camera 200a according to the third embodiment. The difference from the first embodiment is that a touch panel 241 has been added as an operation member. The touch panel 241 recognizes operations in response to the user touching a specific location displayed in the display apparatus 213.

Figure 17A:
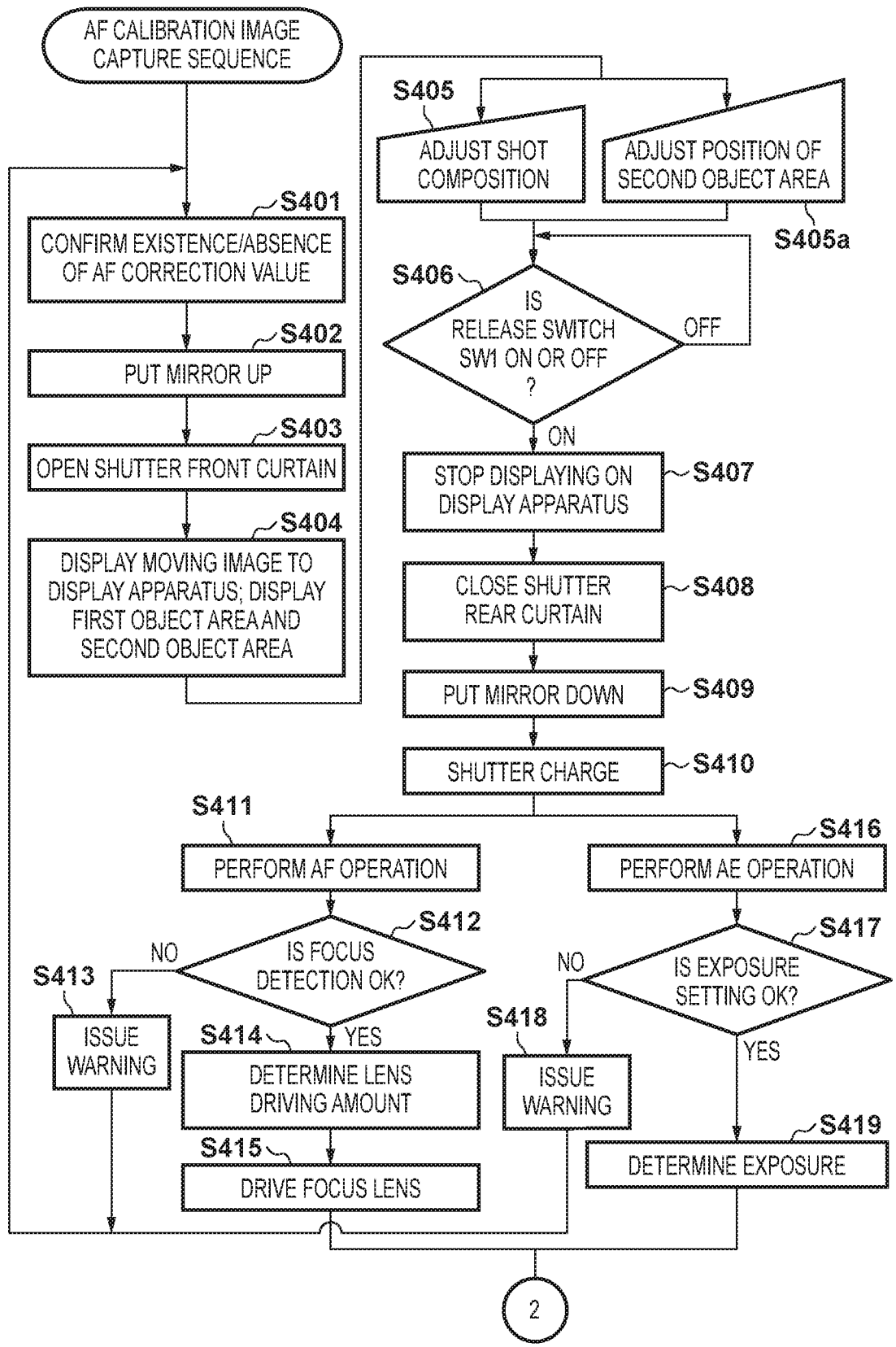
FIGS. 17A and 17B are flowcharts illustrating an AF calibration image capture sequence carried out by the image capturing apparatus according to the third embodiment.
Figure 17B:
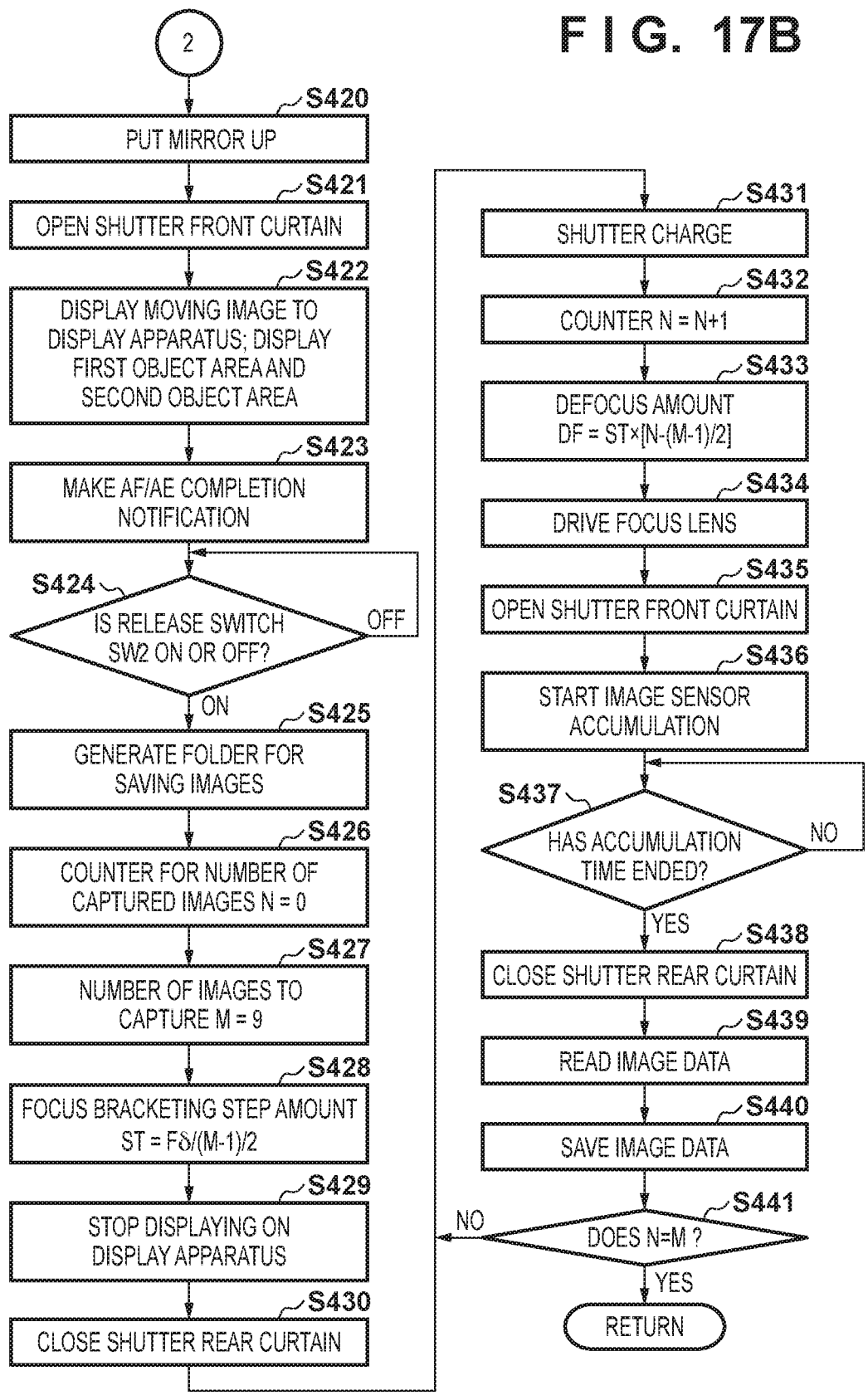

FIGS. 17A and 17B are flowcharts illustrating operations in an AF calibration image capture sequence carried out by the camera 200a according to the third embodiment. The difference from the first embodiment is that the second object area 602 can be moved using the touch panel 241 when the user adjusts the composition for capturing the image in step S405 (step S405a).

FIGS. 18A to 18D are diagrams illustrating the image displayed in the display apparatus 213 before the AF calibration image capture, according to the third embodiment. When an image is displayed as illustrated in FIG. 18A, the user can move the second object area 602 with his or her finger 605. If the user then slides the finger 605, which is placed on the touch panel, in the direction indicated by the arrow in the vicinity of the second object area 602, the second object area 602 can be moved as indicated in FIG. 18B.

The range of the second object area 602 can also be changed by operating the touch panel 241. The range of the second object area 602 can be changed by using two fingers 605 to make pinch-in and pinch-out operations.

As illustrated in FIG. 18C, if the two fingers 605 placed on the touch panel are slid in the directions indicated by the arrows (pinch-out) in the vicinity of the second object area 602, the second object area 602 can be enlarged as indicated in FIG. 18D. Conversely, if the two fingers 605 placed on the touch panel are slid in the direction opposite from the arrows indicated in FIG. 18C (pinch-in), the second object area 602 can be reduced.

According to the third embodiment described thus far, the position of the second object area 602 can be changed during the AF calibration image capturing. As a result, the user can select the composition for the objects more freely, which makes it possible to provide an image capturing apparatus capable of high-accuracy AF calibration in a wider variety of image capturing scenes.

Although the position of the second object area 602 is adjusted using the touch panel 241 in the third embodiment, the operation member is not limited to the touch panel 241. For example, the same effect can be achieved by operating the directional switch 236 to move the second object area 602.

Fourth Embodiment

A fourth embodiment of the present invention will be described next. Note that the configuration of the image capturing apparatus according to the fourth embodiment is the same as the configuration according to the third embodiment unless indicated otherwise. As such, the corresponding constituent elements, operation flowcharts, and the like will not be described.

Figure 19:
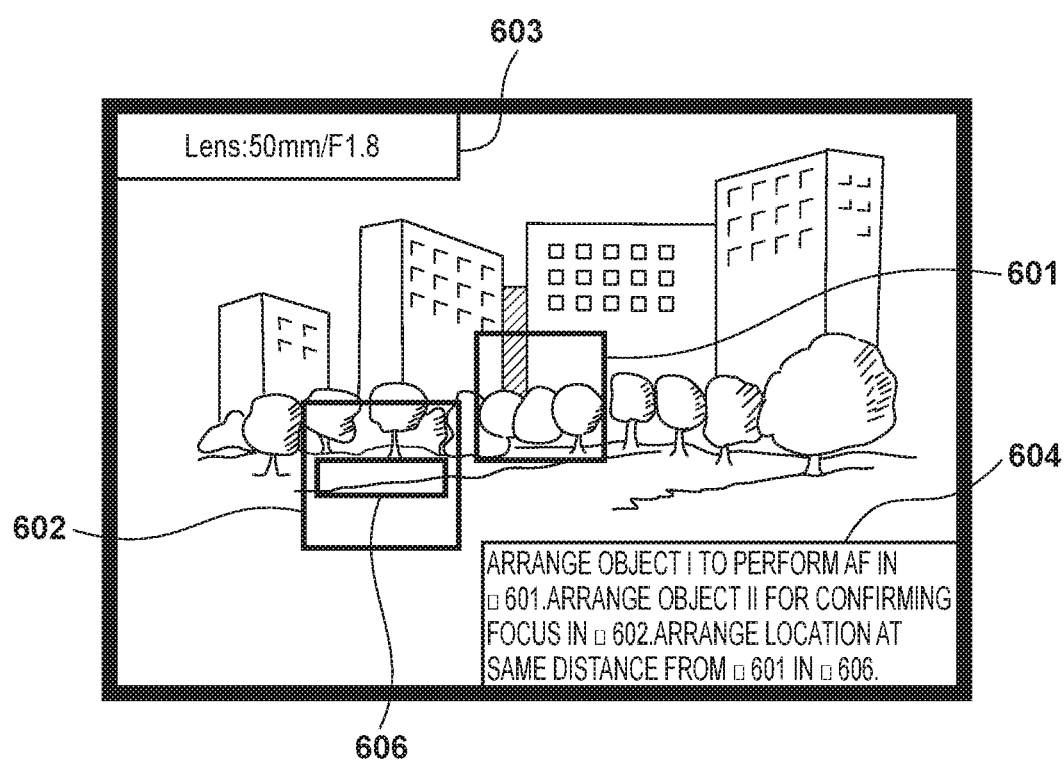
FIG. 19 is a diagram illustrating an image displayed in a display apparatus before AF calibration image capture according to a fourth embodiment.

FIG. 19 is a diagram illustrating the image displayed in the display apparatus 213 before the AF calibration image capture, according to the fourth embodiment. The difference from the third embodiment is that a third object area 606 is present within the second object area 602. Like the second object area 602, the third object area 606 can be moved by operating the touch panel 241.

The third object area 606 is arranged within the range of the second object area 602, and at a location that is the same distance as the first object area 601. Guidance for how the third object area 606 should be arranged is also displayed in the guidance display part 604.

Figure 20:
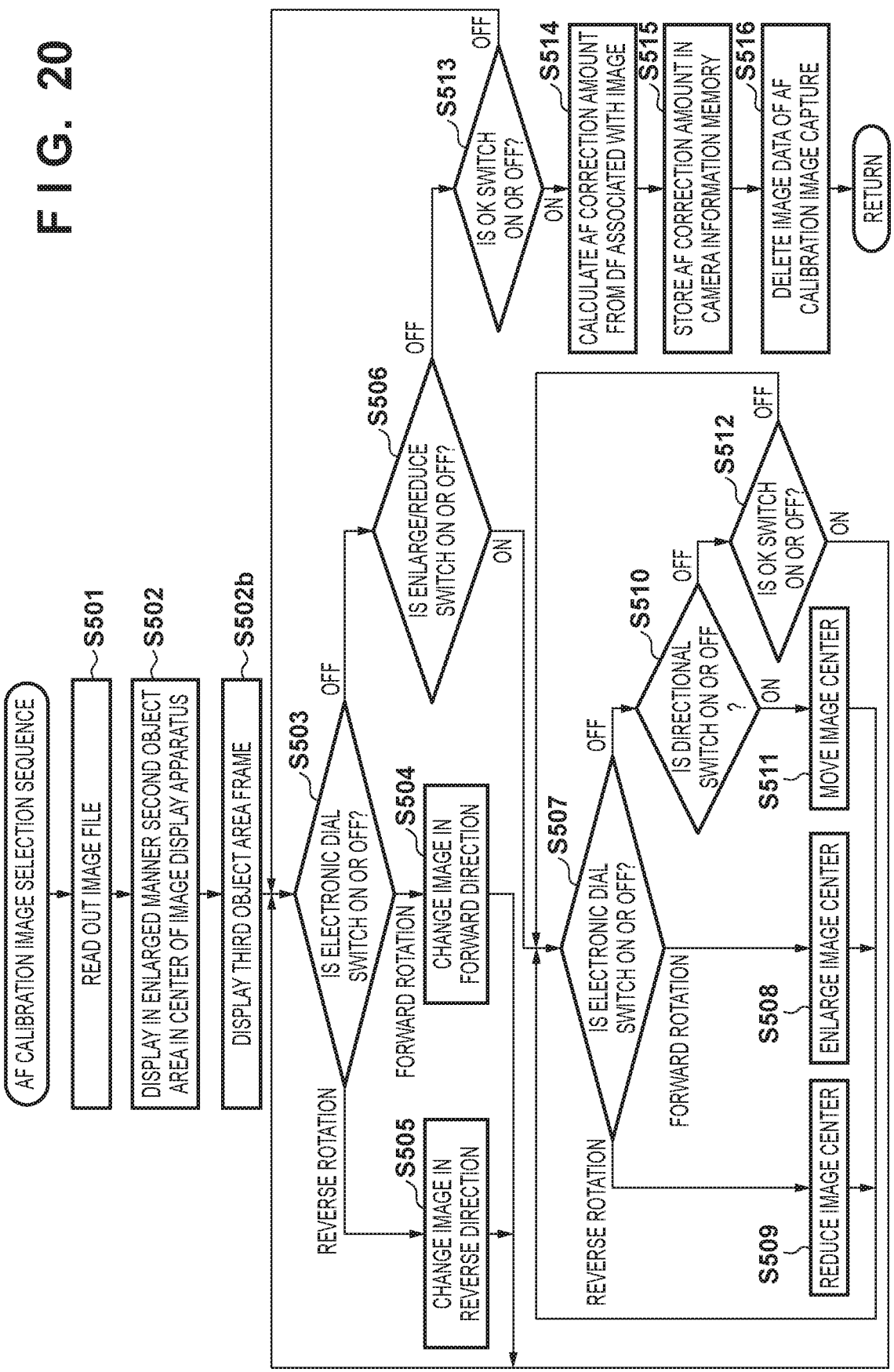
FIG. 20 is a flowchart illustrating an AF calibration image selection sequence carried out by an image capturing apparatus according to the fourth embodiment.

FIG. 20 is a flowchart illustrating operations in an AF calibration image selection sequence carried out by the image capturing apparatus according to the fourth embodiment.

The difference from the first embodiment is the process of step S502b. In the first embodiment, the area of the images captured through bracketing that contains the second object area 602 is displayed in an enlarged manner; however, in the fourth embodiment, the frame of the third object area 606 is also displayed in an overlapping manner. Although the third object area 606 is indicated as a rectangular frame, the method for setting the area is not limited thereto. For example, a line may be used instead of a frame.

By carrying out such a display, even if the first object area 601 is not being displayed, the user can rely on the position of the third object area 606 to select the in-focus image. This is useful when, for example, the first object area 601 and the second object area 602 are distanced from each other, as indicated in FIG. 18B.

According to the fourth embodiment as described thus far, an image capturing apparatus capable of highly-accurate AF calibration, in which the user can appropriately select an in-focus image even when the second object area 602 is not present near the first object area 601, can be provided.

Additionally, evaluating the contrast of the image within the range of the third object area 606 makes it possible to narrow down the in-focus images to a certain extent. Selecting an in-focus image by evaluating the contrast of the image is a known contrast AF technique, and may be used to carry out a process for avoiding the display of images that are not in focus, for example.

Doing so makes it possible for the user to appropriately select the in-focus image even without checking all of the images, with the camera 200a automatically omitting images that are out of focus by a certain amount in order to reduce the burden on the user. Accordingly, an image capturing apparatus capable of highly-accurate AF calibration can be provided.

Although preferred embodiments of the present invention have been described above, the present invention is not intended to be limited to these embodiments, and many variations and alterations are possible within the scope thereof.

For example, in the foregoing embodiments, the AF correction amount is set and applied for the AF unit 204, which employs the secondary image-forming phase difference detection system. However, the present invention is not limited thereto, and the effects of the present invention can be achieved even when using an AF system such as imaging surface phase difference-based AF to calculate the same defocus amount. If both secondary image-forming phase difference and imaging surface phase difference techniques are used, it is necessary to store individual correction values. For example, it is possible to enable the selection of the AF bracket step amount. In this case, even if a large degree of focus correction is required, the focus correction amount can be narrowed down to an appropriate value by executing the AF calibration image capturing multiple times while changing the AF bracket step amount in stages (from a large step amount to a small step amount).

Fifth Embodiment

A fifth embodiment of the present invention will be described next. Note that the configuration of the image capturing apparatus according to the fifth embodiment is the same as the configuration according to the first embodiment unless indicated otherwise. As such, the corresponding constituent elements, operation flowcharts, and the like will not be described.

Figure 21A:
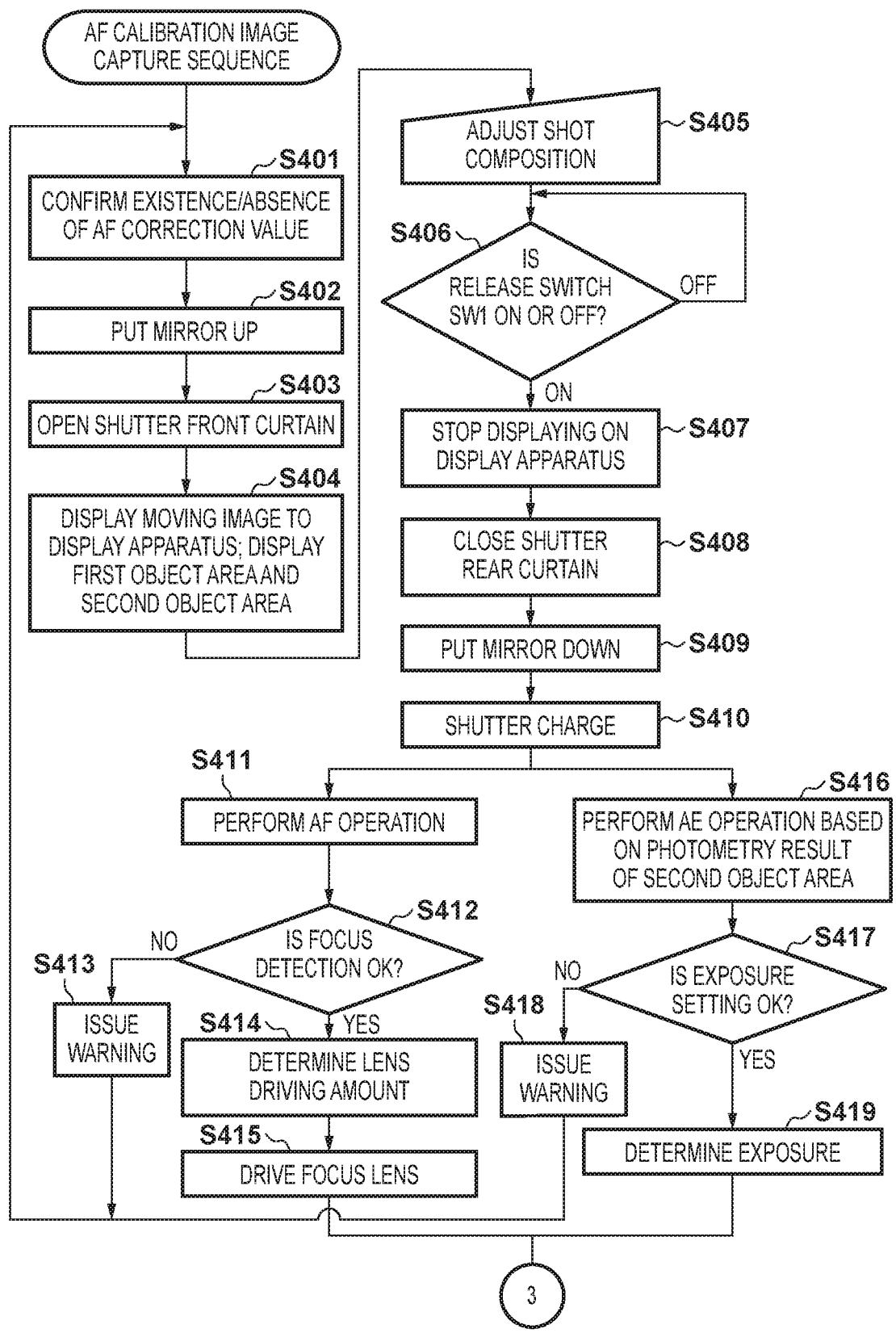
FIGS. 21A and 21B are flowcharts illustrating an AF calibration image capture sequence carried out by an image capturing apparatus according to a fifth embodiment.
Figure 21B:
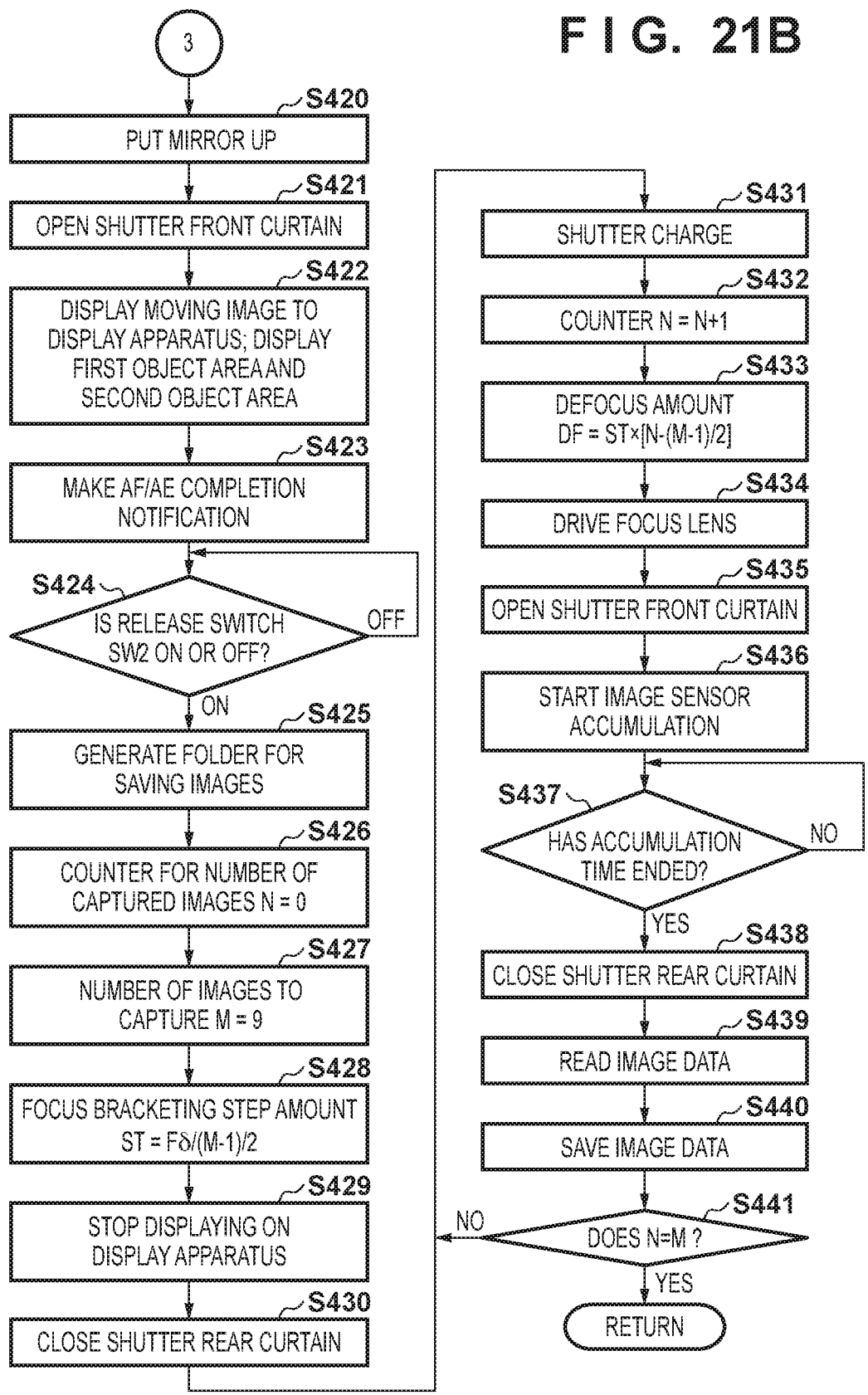

Operations in an AF calibration image capture sequence according to the present embodiment will be described next using FIGS. 21A and 21B. FIGS. 21A and 21B are flowcharts illustrating operations in an AF calibration image capture sequence carried out by the camera 200 according to the fifth embodiment. The flow of FIGS. 21A and 21B differs from the flow of FIGS. 8A and 8B, described in the first embodiment, only in terms of the process carried out in step S616.

In step S616, the object image formed on the focusing screen 205 through the imaging lens 100 is subjected to photometry by the AE unit 207, and the exposure is determined on the basis of a photometry result from the second object area 602. Specifically, the charge accumulation time of the image sensor 210 (shutter speed) and the gain of the image sensor 210 (ISO sensitivity) are determined. Unlike the normal image capture sequence, the aperture is open when setting the exposure in the AF calibration mode.

In the first embodiment, exposure control is carried out so that the vicinity of the selected focus detection area is exposed appropriately, in the same manner as the AE sequence carried out during general image capturing. As opposed to this, in the present embodiment, exposure control is carried out so that the second object area 602 is exposed appropriately. As a result, the second object area 602, which is the primary area of attention, is exposed appropriately during the AF calibration image selection sequence, which makes it possible to more appropriately select the in-focus image.

According to the above-described configuration, the user can appropriately select the in-focus image even in a scene where, for example, there is a large brightness difference between the selected focus detection area and the second object area 602, which makes it possible to provide an image capturing apparatus capable of more highly-accurate AF calibration.

Sixth Embodiment

A sixth embodiment of the present invention will be described next. Note that the configuration of the image capturing apparatus according to the sixth embodiment is the same as the configuration according to the first embodiment unless indicated otherwise. As such, the corresponding constituent elements, operation flowcharts, and the like will not be described.

The first embodiment describes the user adjusting the composition with respect to the object areas displayed by the camera 200. As opposed to this, in the sixth embodiment, the first object area 601 and the second object area 602 are set by the system controller 223 on the basis of a defocus amount of the object image.

FIG. 22 is a schematic diagram illustrating an object image, and a focus detection area in the object image, according to the sixth embodiment. Focus detection areas 801 are focus detection areas of the AF unit 204, and each focus detection area is represented by a broken-line quadrangle. Here, each focus detection area has a vertical sensor and a horizontal sensor, and defocus amounts can be calculated individually by the respective sensors. The vertical direction in the vertical sensors and the horizontal direction in the horizontal sensors correspond to correlation directions. A reference focus detection area 802 is a focus detection area present in the object image, and is a focus detection area used as a reference when setting the first object area 601 and the second object area 602. In the present embodiment, the object image is a rectangular parallelepiped block placed on a desk. A side surface 803 of the rectangular parallelepiped block corresponds to a flat object including the reference focus detection area 802, whereas a desktop surface 804 corresponds to an object exhibiting depth.

Figure 23:
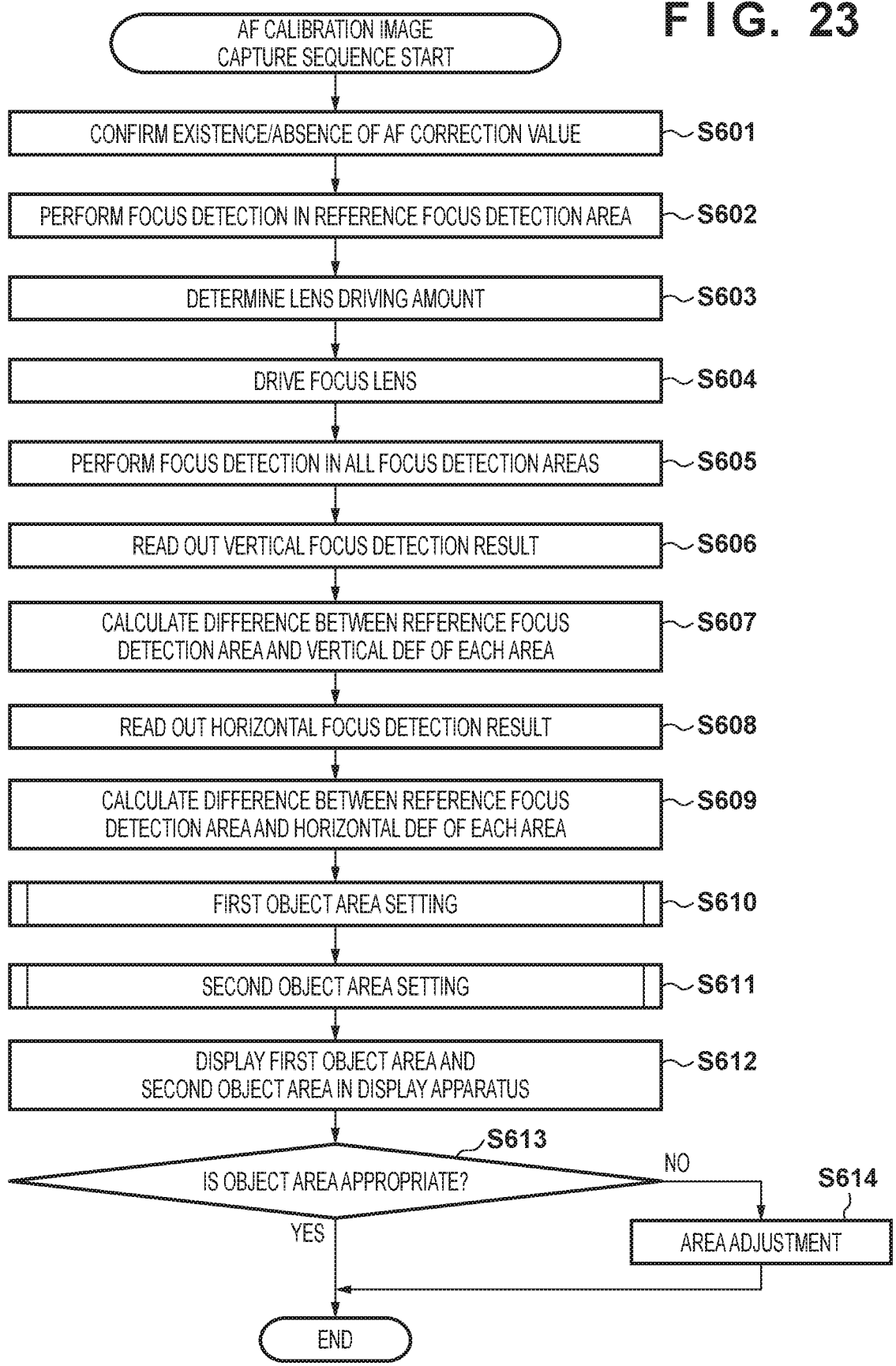
FIG. 23 is a flowchart illustrating a sequence for setting a first object area and a second object area from the object image according to the sixth embodiment.

FIG. 23 is a flowchart illustrating a sequence for setting the first object area 601 and the second object area 602 from the object image, according to the sixth embodiment. This flowchart replaces step S401 to step S421 of the calibration image capture sequence flowchart illustrated in FIGS. 8A and 8B. The processes in this flowchart are realized by the system controller 223 executing programs stored in the camera information memory 222. Note that the same applies to the sub sequences described later.

In step S601, it is confirmed whether or not the AF correction amount corresponding to the mounted imaging lens 100 is stored in the camera information memory 222. In step S602, the AF unit 204 carries out focus detection for the reference focus detection area 802.

In step S603, an amount by which the focus lens 101 is to be driven is determined on the basis of the focus detection result (the defocus amount). Unlike the normal image capture sequence, even if an AF correction amount is stored, that AF correction amount is not used when calculating the lens driving amount. This is because the AF calibration mode is a mode for setting the AF correction amount.

In step S604, the determined lens driving amount is sent to the lens control circuit 104, and the lens control circuit 104 converts data of the received lens driving amount into a number of drive pulses to be supplied to the stepping motor of the lens driving mechanism 103. The stepping motor is driven, and the focus lens 101 is moved, on the basis of this number.

In step S605, the AF unit 204 carries out focus detection. Here, the focus detection is carried out for all of the focus detection areas 801, including the reference focus detection area 802, and a defocus amount from the vertical sensor and a defocus amount from the horizontal sensor are acquired in all of the focus detection areas. As will be described later, in the present embodiment, the first object area 601 and the second object area 602 are set on the basis of these defocus amounts. In this manner, in the present embodiment, the setting of the object areas is also carried out on the basis of the focus detection results from the AF unit 204, which has the same optical path and AF pupil. This makes it possible to set the object areas more accurately than when setting the areas on the basis of the result of another type of AF, such as imaging surface phase difference AF or the like.

In step S606, the defocus amount from the vertical sensor is read out for all of the focus detection areas 801 subjected to the focus detection. In step S607, differences between the vertical defocus amount in each of the focus detection areas 801 and the defocus amount in the reference focus detection area 802 are calculated. In step S608, the defocus amount from the horizontal sensor is read out for all of the focus detection areas 801 subjected to the focus detection. In step S609, differences between the horizontal defocus amount in each of the focus detection areas 801 and the defocus amount in the reference focus detection area 802 are calculated.

In step S610, the first object area 601 is set on the basis of the defocus amounts calculated by the AF unit 204. This makes it possible to eliminate the burden on the user for adjusting the composition with respect to the first object area 601 displayed in advance. Meanwhile, the user can be prompted to take caution if the vicinity of the reference focus detection area 802 contains an object which, lacking a brightness difference in the range for focus detection and having a large amount of focus detection variation, is not suited to focus detection, and the first object area 601 cannot be set appropriately as a result. The sequence for the setting will be described later.

In step S611, the second object area 602 is set on the basis of the defocus amounts calculated by the AF unit 204. This makes it possible to eliminate the burden on the user for adjusting the composition with respect to the second object area 602 displayed in advance. The sequence for the setting will be described later.

In step S612, the first object area 601 and the second object area 602 are displayed in the display apparatus. Here, the display apparatus is the in-viewfinder information display apparatus 208, and the respective object areas can be visually confirmed by the user through the optical viewfinder. As will be described later, it is conceivable that when setting the object areas in step S610 and step S611, the boundaries of the areas cannot be set appropriately. In this case, the display may be varied, such as by lighting the area boundaries that have been set appropriately and flashing the area boundaries that have not been set appropriately, for example. As a result, the user can visually confirm the area boundaries that have been set appropriately and the area boundaries that have not been set appropriately, and can refer to this when determining the object areas in step S613, which will be described next.

In step S613, it is determined whether or not the area settings are appropriate for the first object area 601 and the second object area 602. In other words, the user determines whether there is a flat object suitable for focus detection within the displayed first object area 601, and determines whether there is an object exhibiting depth, suitable for selecting the in-focus image, within the displayed second object area 602. If both of these are suitable, the sequence ends, and the release corresponding to step S424 in FIG. 8B is carried out. However, the process moves to step S614 if an unsuitable setting is made.

In step S614, the user adjusts the object areas. Here, operations such as using the directional buttons to move the boundaries of the areas can be considered as operations for adjusting the object areas. After the areas have been set in a suitable manner, the sequence ends, and the release corresponding to step S424 in FIG. 8B is carried out. The rest of the flow is the same as in FIGS. 8A and 8B, with focus bracketing being carried out, and the calibration image capture sequence ending.

FIGS. 24A to 24C are a schematic diagram illustrating the focus detection areas 801 according to the sixth embodiment, and a diagram illustrating an example of defocus amount differences from the reference focus detection area 802. FIG. 24A is a diagram schematically illustrating how the focus detection areas 801 include vertical sensors and horizontal sensors. FIG. 24B is a diagram illustrating an example of differences between the defocus amounts of the vertical sensors in the focus detection areas and the defocus amount in the reference focus detection area 802. This corresponds to the result of calculating the defocus amount differences in step S607. FIG. 24C is a diagram illustrating an example of differences between the defocus amounts of the horizontal sensors in the focus detection areas and the defocus amount in the reference focus detection area 802. This corresponds to the result of calculating the defocus amount differences in step S609.

Figure 25A:
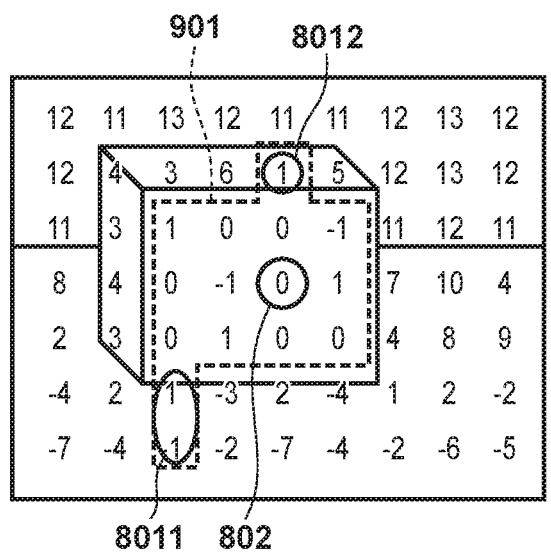
FIGS. 25A to 25C are diagrams illustrating the setting of the first object area according to the sixth embodiment.
Figure 25B:
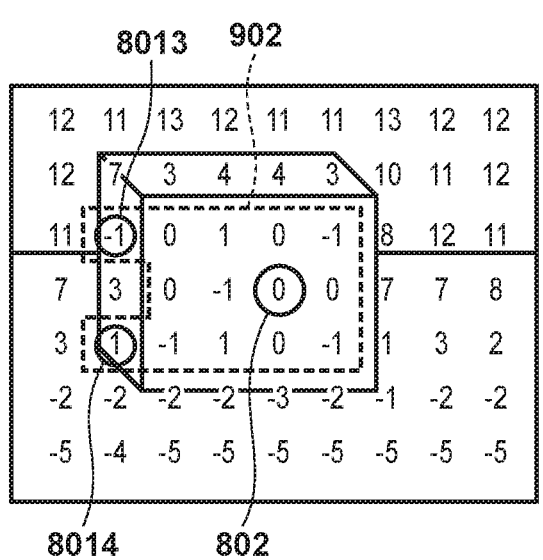
Figure 25C:
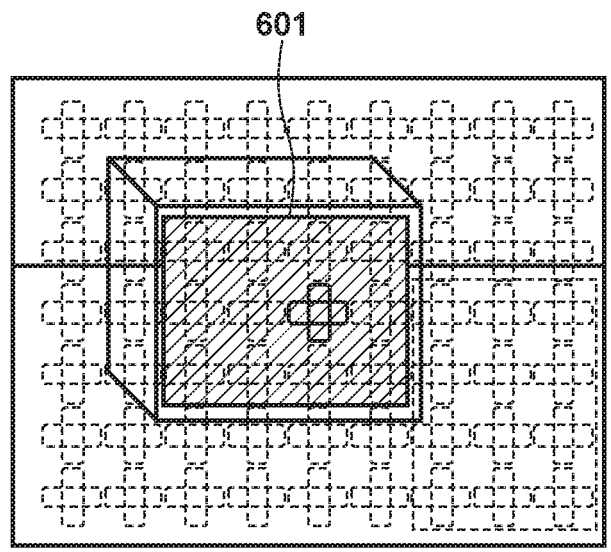
Figures 26A, 26B, 26C:
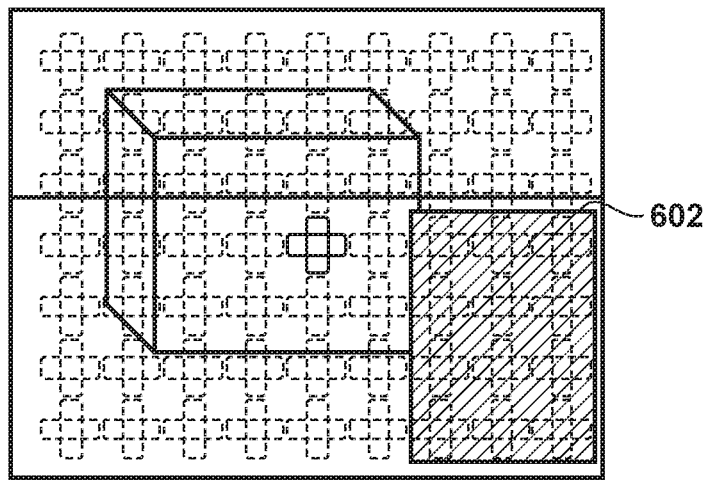
FIGS. 26A to 26C are diagrams illustrating the setting of the second object area according to the sixth embodiment.

FIGS. 25A to 25C are diagrams illustrating an example of setting the first object area 601 according to the sixth embodiment. FIGS. 26A to 26C are diagrams illustrating an example of setting the second object area 602 according to the sixth embodiment. A method for setting the object areas will be described hereinafter with reference to these drawings.

Figure 27:
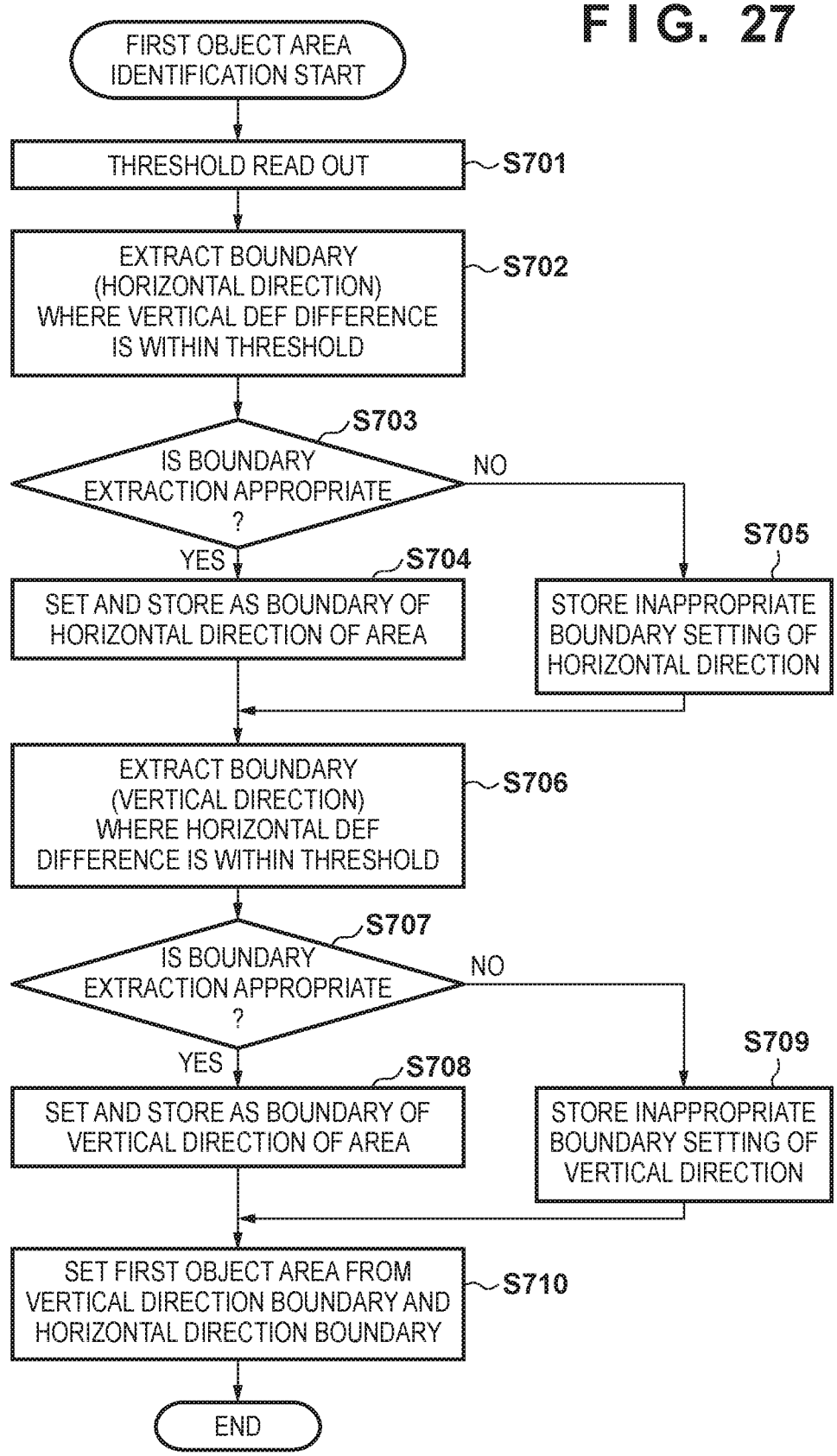
FIG. 27 is a flowchart illustrating a sequence for setting the first object area according to the sixth embodiment.

FIG. 27 is a flowchart illustrating a sequence for setting the first object area 601 according to the sixth embodiment.

In step S701, a threshold pertaining to the first object area 601 is loaded. When the difference between the defocus amounts of the reference focus detection area 802 and the focus detection area is within this threshold, the defocus amount of that focus detection area is within a range of focus detection variation, such as detection error, with respect to the reference focus detection area 802, and the focus detection objects in the reference focus detection area 802 and this focus detection area are determined to be on the same plane. The loaded threshold is temporarily stored in the camera information memory 222, and is held until the sequence ends.

In step S702, a boundary where the vertical difference calculated in step S607 is within the threshold is extracted. In other words, a boundary within a range that is within the same plane as the reference focus detection area 802 is extracted. FIG. 25A illustrates an example in which the boundary is extracted using a threshold of ±1. At this time, a boundary line 901 is extracted as a boundary between points for the differences within ±1 and other points.

In step S703, the system controller 223 determines whether or not the extracted boundary is appropriate. If the boundary extraction is appropriate, the process moves to step S704, whereas if the boundary extraction is inappropriate, the process moves to step S705. A case where the corresponding boundary is narrow, such as when a focus detection area adjacent to the reference focus detection area 802 is outside of the threshold, is conceivable as an example of inappropriate boundary extraction.

In step S704, the extracted boundary is set as a boundary in the horizontal direction. In other words, ends (boundaries) of an area in a direction (the horizontal direction) approximately orthogonal to the correlation direction used for calculating the defocus amount (the vertical direction) are set so that the first object area 601 is set as an area within a predetermined range with respect to the defocus amount of the reference focus detection area 802. The set boundaries are temporarily stored in the camera information memory 222, and are held until the end of the calibration image capture sequence for setting the first object area 601 and the second object area 602 from the object image, illustrated in FIG. 23. The part of the boundary line 901 illustrated in FIG. 25A indicated by a solid line corresponds to the boundary set in the horizontal direction.

The meaning of this boundary will be described hereinafter. In the boundary part of the first object area 601, the interior of the boundary is assumed to be a flat object, whereas the exterior of the boundary is assumed to be a background or the like distanced from the flat object, and thus the object distance is assumed to change drastically near the boundary. Carrying out focus detection for an area spanning the inside and outside of a boundary in this manner corresponds to focus detection for an object having what is known as perspective conflict, and can result in a drop in the focus detection accuracy. In the example of FIG. 25A, an object having perspective conflict is present in the focus detection field of view of the vertical sensors in focus detection areas 8011 and 8012, and thus the focus detection results will be different. The object will be recognized as being within the boundary line 901 despite the boundary line 901 not actually being present on the side surface 803. Accordingly, a situation in which the focus detection area spans the inside and outside of the boundary can be avoided by having the correlation direction and the direction in which the area boundary is set being approximately orthogonal, as described above. This makes it possible to increase the accuracy at which the defocus amounts are calculated when setting the boundary. The same applies in step S708, described below, where the area ends in the vertical direction are set using the horizontal detection results; these are then combined, and the first object area 601 is set in step S710, which will be described later.

On the other hand, in step S705, information indicating that the boundary setting is inappropriate is temporarily stored in the camera information memory 222 for the horizontal direction boundary of the first object area. The information is held until the end of the calibration image capture sequence for setting the first object area 601 and the second object area 602 from the object image, illustrated in FIG. 23.

In step S706, a boundary where the horizontal difference calculated in step S609 is within the threshold is extracted. In other words, a boundary within a range that is within the same plane as the reference focus detection area 802 is extracted. FIG. 25B illustrates an example in which the boundary is extracted using a threshold of ±1. At this time, a boundary line 902 is extracted as a boundary between points for the differences within 1 and other points.

In step S707, the system controller 223 determines whether or not the extracted boundary is appropriate. If the boundary extraction is appropriate, the process moves to step S708, whereas if the boundary extraction is inappropriate, the process moves to step S709. A case where the corresponding boundary is narrow, such as when a focus detection area adjacent to the reference focus detection area 802 is outside of the threshold, it is conceivable as an example of inappropriate boundary extraction.

In step S708, the extracted boundary is set as a boundary in the vertical direction. In other words, ends (boundaries) of an area in a direction (the vertical direction) approximately orthogonal to the correlation direction used for calculating the defocus amount (the horizontal direction) are set so that the first object area 601 is set as an area within a predetermined range with respect to the defocus amount of the reference focus detection area 802. The set boundaries are temporarily stored in the camera information memory 222, and are held until the end of the calibration image capture sequence for setting the first object area 601 and the second object area 602 from the object image, illustrated in FIG. 23. The part of the boundary line 902 illustrated in FIG. 25B indicated by a solid line corresponds to the boundary set in the vertical direction. In the example of FIG. 25B, an object having perspective conflict is present in the focus detection field of view of the horizontal sensors in focus detection areas 8013 and 8014, and thus the focus detection results will be different. The object will be recognized as being within the boundary line 902 despite the boundary line 902 not actually being present on the side surface 803.

In step S709, information indicating that the boundary setting is inappropriate is temporarily stored in the camera information memory 222 for the vertical direction boundary of the first object area. The information is held until the end of the calibration image capture sequence for setting the first object area 601 and the second object area 602 from the object image, illustrated in FIG. 23.

In step S710, the boundaries in the vertical and horizontal directions, set and stored in step S704 and step S708, are combined, and the first object area 601 is set. FIG. 25C illustrates the first object area 601. The diagonally-hatched part indicates the first object area 601 set by combining the vertical and horizontal boundaries. The area ends in the horizontal direction are set from the vertical detection results, and the area ends in the vertical direction are set from the horizontal detection results, through this combination, and as a result, the focus detection areas 8011, 8012, 8013, and 8014 are appropriately excluded from the first object area 601. Note that at this time, information is stored for boundaries for which an indication that the boundary setting is inappropriate has been stored in the foregoing steps S705 and S709, boundaries that cannot be connected appropriately, and so on. The flow for setting the first object area 601 then ends.

The first object area 601 set through the flow described above is displayed in the display apparatus in step S612 of the calibration image capture sequence illustrated in FIG. 23. Note that at this time, boundaries for which an indication that the boundary setting is inappropriate has been stored in the foregoing steps S705 and S709 may be displayed in a different manner. For example, a method is conceivable in which the area boundaries that have been set appropriately are lighted and the area boundaries that have not been set appropriately are flashed.

Figure 28:
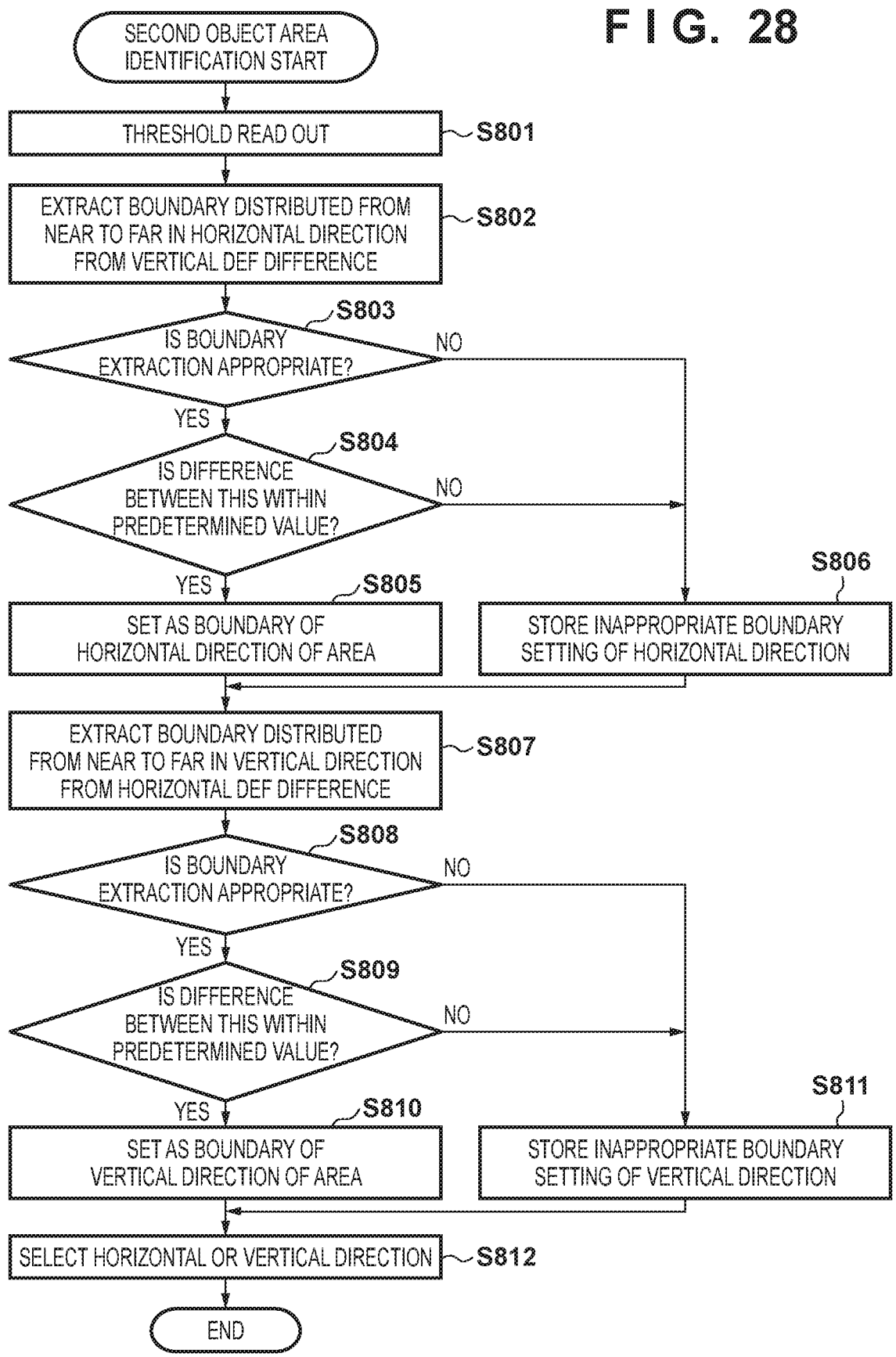
FIG. 28 is a flowchart illustrating a sequence for setting the second object area according to the sixth embodiment.

FIG. 28 is a flowchart illustrating a sequence for setting the second object area 602 according to the sixth embodiment.

In step S801, thresholds pertaining to the second object area 602 is loaded. The thresholds loaded here are a threshold for setting an area of distribution from near to far relative to the defocus amount of the reference focus detection area 802, and a threshold for setting an area where the defocus amount is distributed substantially uniformly throughout a predetermined range from near to far. The meaning of this will be described hereinafter. When the defocus amounts in the area set as the second object area 602 are distributed above and below the threshold, the object within the second object area 602 has a sufficient amount of depth. When the defocus amounts are distributed substantially uniformly from near to far, the object within the second object area is distributed substantially uniformly in the depth direction. As a result, the in-focus position is easily visible, and the object can be determined to be a favorable object for determining the in-focus image. The loaded thresholds are temporarily stored in the camera information memory 222, and are held until the sequence ends.

In step S802, a boundary distributed from near to far in the horizontal direction is extracted with respect to the vertical differences calculated in step S607. Note that the threshold for the near side may be a different value from the threshold for the far side. FIG. 26A illustrates an example in which the boundary is extracted using −5 for the near-side threshold and +7 for the far-side threshold. Here, there are no areas where the defocus amount is distributed from −5 to +7 in the rows enclosed within broken lines. In other words, in this example, an appropriate boundary cannot be set with respect to the horizontal direction boundary extraction using the vertical sensors.

In step S803, it is determined whether or not the extracted boundary is appropriate. If the boundary extraction is appropriate, the process moves to step S804, whereas if the boundary extraction is inappropriate, the process moves to step S806. A case where a corresponding boundary cannot be set, such as when there is no focus detection area sufficiently distanced from the reference focus detection area 802, is conceivable as an example of inappropriate boundary extraction.

In step S804, it is determined, for the focus detection areas between the horizontal direction boundaries, whether or not the differences in the defocus amount from the adjacent focus detection areas are within a predetermined range.

In step S805, the extracted boundary is set as a boundary, in the horizontal direction, for an object area exhibiting depth. In other words, the second object area 602 is set as described below, in tandem with steps S802 and S804 carried out up to this point. The second object area 602 is set as an area of distribution from near to far relative to the defocus amount of the reference focus detection area 802. Accordingly, an object within the second object area 602 is confirmed as having sufficient depth for determining an in-focus image. Additionally, the second object area 602 is set as an area of substantially uniform distribution from near to far relative to the defocus amount of the reference focus detection area 802. Accordingly, when determining the in-focus image in images captured through bracketing, changes in the focal position from image to image area easy to visually confirm. Additionally, the ends of the areas in the approximately orthogonal direction (the horizontal direction) are set with respect to the correlation direction used to calculate the defocus amounts (the vertical direction). In the present embodiment, the second object area 602 is set as an area in which an object exhibiting depth is arranged. If the object exhibits depth from one end to the other end of this area, and the depth direction matches the correlation direction, the focus detection will be carried out on an object having what is known as perspective conflict, and this can result in a drop in the focus detection accuracy. Accordingly, by making the direction in which the area boundaries are set approximately orthogonal to the correlation direction, the accuracy of the boundary setting can be improved. The same applies in step S812, described below. The set boundaries are temporarily stored in the camera information memory 222, and are held until the end of the calibration image capture sequence for setting the first object area 601 and the second object area 602 from the object image, illustrated in FIG. 23.

In step S806, an indication that the boundary setting is inappropriate, with respect to the horizontal direction boundaries of the second object area 602, is temporarily stored in the camera information memory 222, and is held until the end of the calibration image capture sequence for setting the first object area 601 and the second object area 602 from the object image, illustrated in FIG. 23.

In step S807, an area distributed from near to far in the vertical direction is extracted with respect to the horizontal differences calculated in step S609. Note that the threshold for the near side may be a different value from the threshold for the far side. FIG. 26B illustrates an example in which the boundary is extracted using −5 for the near-side threshold and +7 for the far-side threshold. Here, the defocus amounts are distributed in the vertical direction for columns enclosed within solid lines. On the other hand, there are no areas where the defocus amount is distributed from −5 to +7 in the columns enclosed within broken lines.

In step S808, it is determined whether or not the extracted boundary is appropriate. If the boundary extraction is appropriate, the process moves to step S809, whereas if the boundary extraction is inappropriate, the process moves to step S811. A case where a corresponding boundary cannot be set, such as when there is no focus detection area sufficiently distanced from the reference focus detection area 802, is conceivable as an example of inappropriate boundary extraction.

In step S809, it is determined, for the focus detection areas between the vertical direction boundaries, whether or not the differences in the defocus amount from the adjacent focus detection areas are within a predetermined range. FIG. 26B illustrates an example in which the range of the difference is determined as 4±1. In columns 9031, 9033, and 9034, the differences from the adjacent defocus amounts are all within 4±1. A determination of "appropriate" is therefore made. However, in column 9032, there is a focus detection area where the differences from the adjacent defocus amount are 0 and 1, and thus a determination of "inappropriate" is made.

In step S810, the extracted boundary is set as a boundary, in the vertical direction, for an object area exhibiting depth. In other words, the second object area 602 is set as described below, in tandem with steps S807 and S809 carried out up to this point. The second object area 602 is set as an area distributed from near to far relative to the defocus amount of the reference focus detection area 802. Accordingly, an object within the second object area 602 is confirmed as having sufficient depth for determining an in-focus image. Additionally, the second object area 602 is set as an area distributed substantially uniformly from near to far relative to the defocus amount of the reference focus detection area 802. Accordingly, when determining the in-focus image in images captured through bracketing, changes in the focal position from image to image area easy to visually confirm. Additionally, the ends of the areas in the approximately orthogonal direction (the vertical direction) are set with respect to the correlation direction used to calculate the defocus amounts (the horizontal direction). As a result, the accuracy of the boundary setting can be improved, in the same manner as in the aforementioned step S806. Here, if the areas are divided as indicated in FIG. 26B, for example, a process of selecting an area broader in the depth direction, of selecting an area closest to the first object area, and so on are conceivable as processing for the setting. The set boundaries are temporarily stored in the camera information memory 222, and are held until the end of the calibration image capture sequence for setting the first object area 601 and the second object area 602 from the object image, illustrated in FIG. 23.

In step S811, an indication that the boundary setting is inappropriate, with respect to the vertical direction boundaries of the second object area 602, is temporarily stored in the camera information memory 222, and is held until the end of the calibration image capture sequence for setting the first object area 601 and the second object area 602 from the object image, illustrated in FIG. 23.

In step S812, whether to set the horizontal direction boundaries of the object area exhibiting depth, set in step S805, or the vertical direction boundaries of the object area exhibiting depth, set in step S810, as the second object area 602 is selected. The boundaries that are broader with respect to the depth direction, the boundaries in which the amount of change in the defocus amount in the direction of the range is uniform, and so on are conceivable as references for this selection. FIG. 26C illustrates the second object area 602. The diagonally-hatched part indicates the second object area 602 selected as the object area exhibiting depth in the vertical direction. In the present embodiment, when setting this area, the display is simplified by aligning an upper end of the column 9035 with column 9033 and column 9034 and giving the area a rectangular shape, but the embodiment is not limited thereto. The flow for setting the second object area 602 then ends.

As described thus far, according to the configuration described in the sixth embodiment, the first object area 601 and the second object area 602 are set on the basis of defocus amounts calculated by the AF unit 204 in the AF calibration mode. This makes it possible to eliminate the burden placed on the user for adjusting the composition with respect to the object area. Additionally, when setting the first object area 601, a range with a low amount of difference with respect to the defocus amount of the reference focus detection area 802 is set. As a result, the first object area 601 is set as an area in which a flat object, which is favorable for focus detection, is present. Additionally, when setting the boundaries of the first object area 601, the direction in which the boundaries are set is made orthogonal to the correlation direction. As a result, a situation where focus detection is carried out on an object having perspective conflict when detecting the focus for the boundary areas can be avoided, which makes it possible to reduce focus detection error and set the area. Furthermore, when setting the second object area 602, an area in which the defocus amounts are distributed above and below the defocus amount of the reference focus detection area 802, and in which there is little variation in the amount of change throughout the distribution, is set. As a result, the second object area 602 is set as an area in which an object exhibiting depth, which is favorable for selecting an in-focus image, is present. Additionally, when setting the boundaries of the second object area 602, the direction in which the boundaries are set is made orthogonal to the correlation direction. As a result, a situation where focus detection is carried out on an object having perspective conflict due to depth in the correlation direction can be avoided, which makes it possible to reduce focus detection error and set the area.

Seventh Embodiment

A seventh embodiment of the present invention will be described next. Note that the configuration of the image capturing apparatus according to the seventh embodiment is the same as the configuration according to the first embodiment unless indicated otherwise. As such, the corresponding constituent elements, operation flowcharts, and the like will not be described.

In step S605 described in the sixth embodiment, the AF unit 204 carries out focus detection in order to set the object areas. However, in the seventh embodiment, focus detection is carried out for setting the object areas using the imaging surface phase difference AF system, instead of the AF unit 204 according to the first embodiment, which uses the secondary image-forming phase difference system. Generally, the imaging surface phase difference AF system, which is carried out by the image sensor, has a broader focus detection range than the secondary image-forming phase difference AF system, in which the areas where light is conducted within the unit are limited to the focus detection areas. Accordingly, the freedom of composition can be increased, and the object area can be set for a wider variety of scenes. Additionally, with the imaging surface phase difference AF system, the focus detection can be carried out with the mirror up, which makes it possible to make adjustments while confirming the LCD in the rear surface of the camera, which improves the operability for the user, even when adjusting the areas as described with reference to step S614 in the sixth embodiment.

Figure 29:
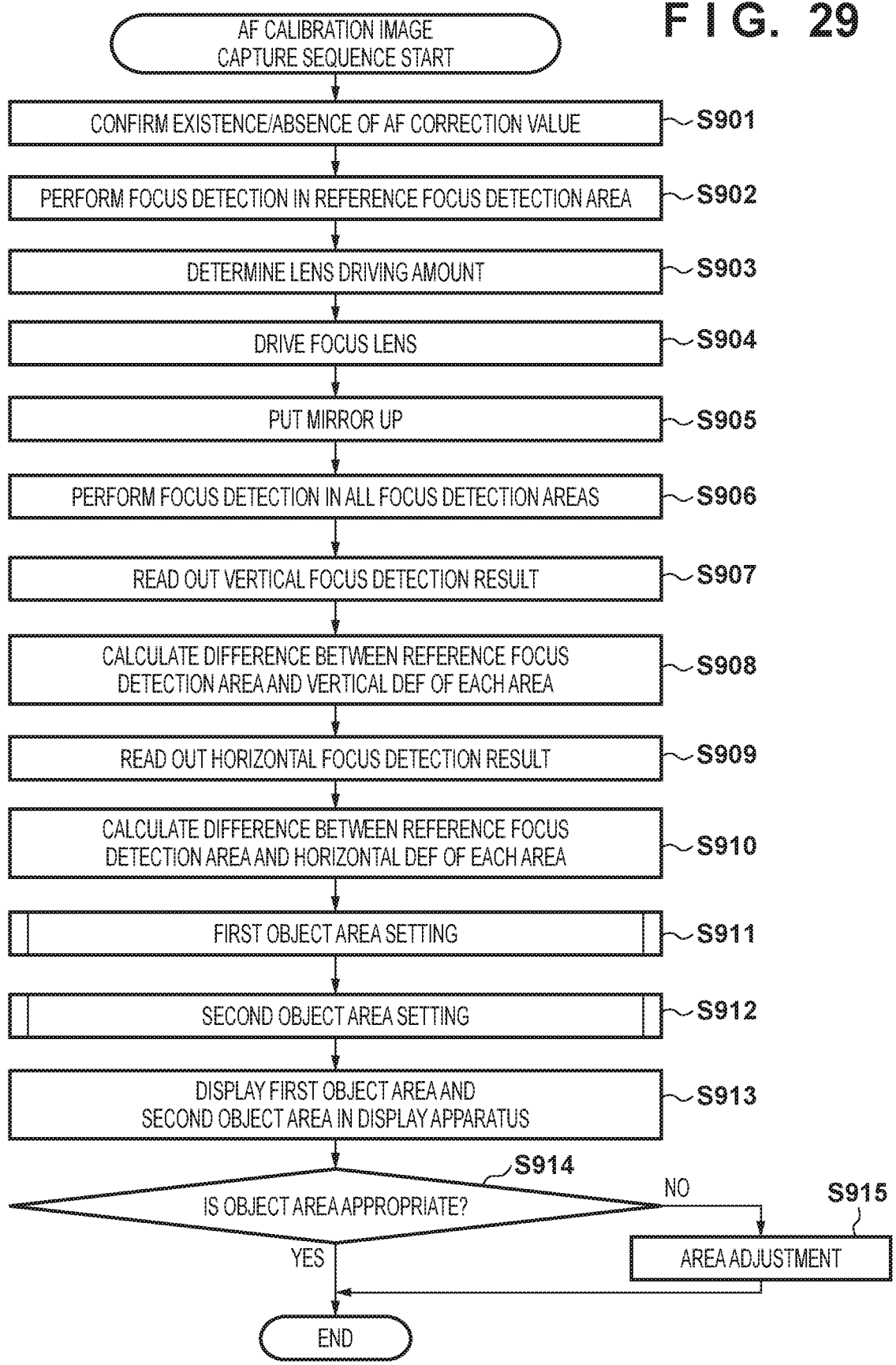
FIG. 29 is a flowchart illustrating a sequence for setting a first object area and a second object area from the object image according to a seventh embodiment.

FIG. 29 is a flowchart illustrating a sequence for setting the first object area 601 and the second object area 602 from an object image in the camera 200 according to the seventh embodiment. This flowchart replaces step S401 to step S421 of the calibration image capture sequence flowchart illustrated in FIGS. 8A and 8B. The processes in this flowchart are realized by the system controller 223 executing programs stored in the camera information memory 222. Note that the same applies to the sub sequences described later.

Figure 30:
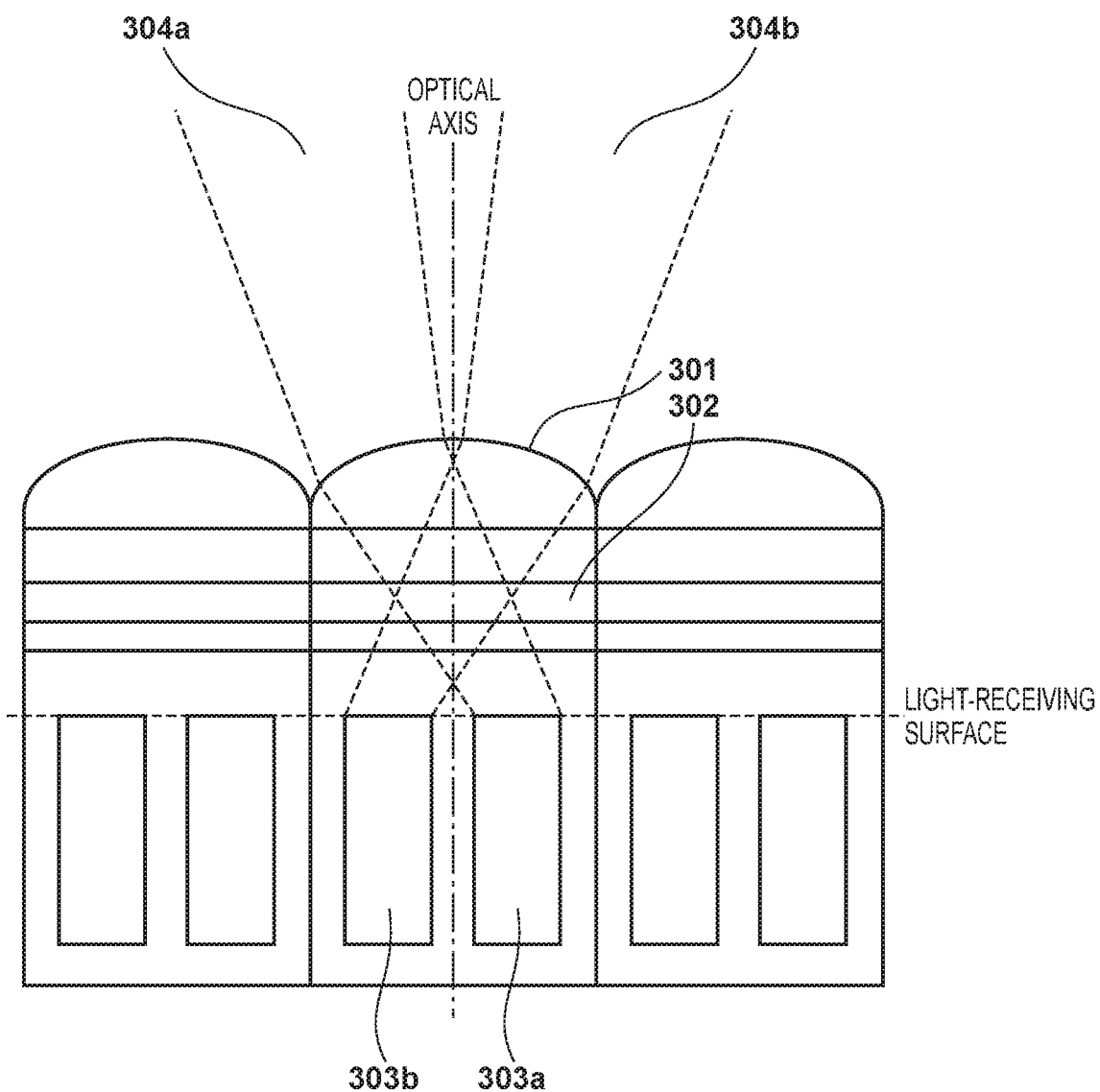
FIG. 30 is a diagram illustrating the basic structure of focus detection pixels, a plurality of which are arranged in an image sensor according to the seventh embodiment.

The configuration of the image sensor 210, which carries out imaging surface phase difference AF, will be described here. FIG. 30 is a diagram illustrating the basic structure of focus detection pixels, a plurality of which are disposed within the image sensor 210 according to the seventh embodiment. A plurality of the focus detection pixels are arranged in the image sensor 210, and focus detection is carried out by using the plurality of focus detection pixels.

Each focus detection pixel includes a wiring layer 302 disposed below a microlens 301, and photoelectric conversion units 303a and 303b, which convert received light into electrical signals, are disposed below the wiring layer 302. A light beam 304a is a light beam received by the photoelectric conversion unit 303a, whereas a light beam 304b is a light beam received by the photoelectric conversion unit 303b. As illustrated in FIG. 30, the photoelectric conversion unit 303a and the photoelectric conversion unit 303b receive the light beams passing through different areas of the exit pupil of the lens (AF pupil). A plurality of focus detection pixels having matching AF pupils are arranged within the image sensor; a correlation operation is carried out for the electrical signals for two images corresponding to the light beam 304a and the light beam 304b received by the focus detection pixels, and a phase difference between the two images is calculated. A defocus amount can be obtained from this phase difference. Here, the division direction of the AF pupil is called the "correlation direction", as with the focus detection carried out by the AF unit 204. A focus detection pixel group dividing the angle of view in the vertical direction is referred to as a "vertical sensor", and a focus detection pixel group dividing the angle of view in the horizontal direction is referred to as a "horizontal sensor".

In step S901, it is confirmed whether or not the AF correction amount corresponding to the mounted imaging lens 100 is stored in the camera information memory 222. In step S902, the AF unit 204 carries out focus detection for the reference focus detection area 802.

In step S903, an amount by which the focus lens 101 is to be driven is determined on the basis of the focus detection result (the defocus amount). Unlike the normal image capture sequence, even if an AF correction amount is stored, that AF correction amount is not used when calculating the lens driving amount. This is because the AF calibration mode is a mode for setting the AF correction amount.

In step S904, the determined lens driving amount is sent to the lens control circuit 104, and the lens control circuit 104 converts data of the received lens driving amount into a number of drive pulses to be supplied to the stepping motor of the lens driving mechanism 103. The stepping motor is driven, and the focus lens 101 is moved, on the basis of this number.

In step S905, the quick-return mirror 202 is driven upward. In step S906, the imaging surface phase difference AF is carried out on the basis of the outputs of the focus detection pixels in the image sensor. Here, the focus detection is carried out for all of the focus detection areas for which focus detection is possible. In other words, a defocus amount from the vertical sensor and a defocus amount from the horizontal sensor are acquired in all of the focus detection areas.

In step S907, the defocus amount from the vertical sensor is read out for all of the focus detection areas 801 subjected to the focus detection. In step S908, differences between the vertical defocus amount in each of the focus detection areas 801 and the defocus amount in the reference focus detection area 802 are calculated. In step S909, the defocus amount from the horizontal sensor is read out for all of the focus detection areas 801 subjected to the focus detection. In step S910, differences between the horizontal defocus amount in each of the focus detection areas 801 and the defocus amount in the reference focus detection area 802 are calculated.

In step S911, the first object area 601 is set on the basis of the defocus amounts calculated through the imaging surface phase difference AF. The setting sequence is the same as that described using FIG. 27 in the sixth embodiment.

In step S912, the second object area 602 is set on the basis of the defocus amounts calculated through the imaging surface phase difference AF. The setting sequence is the same as that described using FIG. 28 in the sixth embodiment.

In step S913, the first object area 601 and the second object area 602 are displayed in the display apparatus. Here, the display apparatus used is the display apparatus 213, and in the present embodiment, is a unit including a liquid crystal panel capable of color display, a backlight, and a display control circuit for driving these elements. As described earlier, it is conceivable that when setting the object areas in step S911 and step S912, the boundaries of the areas cannot be set appropriately. In this case, the display may be varied, such as by lighting the area boundaries that have been set appropriately and flashing the area boundaries that have not been set appropriately, for example. As a result, the user can visually confirm the area boundaries set appropriately by the image capturing apparatus and the area boundaries set inappropriately, and can use this as a reference when determining the object areas in step S915, which will be described below.

In step S914, it is determined whether or not the area settings are appropriate for the first object area 601 and the second object area 602. In other words, the user determines whether there is a flat object suitable for focus detection within the displayed first object area 601, and determines whether there is an object exhibiting depth, suitable for selecting the in-focus image, within the displayed second object area 602. If both of these are suitable, the sequence ends, and the release corresponding to step S424 in FIG. 8B is carried out. However, the process moves to step S915 if an unsuitable setting is made.

In step S915, the user adjusts the object areas. Here, operations such as using the directional buttons to move the boundaries of the areas can be considered as operations for adjusting the object areas. After the areas have been set in a suitable manner, the sequence ends, and the release corresponding to step S424 in FIG. 8B is carried out. The flow thereafter is the same as in FIG. 8B.

As described thus far, according to the configuration described in the seventh embodiment, the first object area 601 and the second object area 602 are set on the basis of defocus amounts calculated through imaging surface phase difference AF in the AF calibration mode. This makes it possible to set the object areas in a wider variety of scenes. Additionally, adjustments can be made while confirming the LCD in the rear of the camera even when adjusting the object areas, which improves the operability for the user.

Although preferred embodiments of the present invention have been described above, the present invention is not intended to be limited to these embodiments, and many variations and alterations are possible within the scope thereof.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-021250, filed Feb. 8, 2018, which is hereby incorporated by reference herein in its entirety.

What is claimed is:

1. An image capturing apparatus comprising:
    an image sensor configured to capture an object image formed by an imaging lens;
    a display configured to display an image captured through a focus bracketing;
    a processor; and
    a memory holding a program which makes the processor function as:
    a focus detection unit for detecting a focus position of the imaging lens;
    an imaging control unit configured to carry out the focus bracketing in which the imaging control unit causes the image sensor to capture a plurality of images while controlling the focus position of the imaging lens to change by predetermined amounts at a time; and
    a display control unit configured to cause the display device to display a guide indicating a first area, a guide indicating a second area, and a guide for prompting the user to set a composition for image capture so that an object suitable for the focus detection of the imaging lens is arranged in the first area and an object suitable for determining an image that is in focus is arranged in the second area, before the focus bracketing is carried out.

2. The image capturing apparatus according to claim 1, wherein the guide includes a first frame indicating the first area and a second frame indicating the second area.

3. The image capturing apparatus according to claim 1, wherein the object suitable for the focus detection of the imaging lens is a substantially flat, high-contrast object, and the object suitable for determining an image that is in focus is an object exhibiting depth.

4. The image capturing apparatus according to claim 1, wherein the display control unit causes the display device to display a guide indicating a third area within the second area, the third area being an area in which an object is arranged at the same distance as the object arranged in the first area.

5. The image capturing apparatus according to claim 1, wherein the display control unit causes the display device to display the second area in an enlarged manner in the case where an image captured through the focus bracketing is played back.

6. The image capturing apparatus according to claim 1, wherein the display control unit displays the second area in a different manner than the areas aside from the second area.

7. The image capturing apparatus according to claim 1, further comprising:
    an operation device for the user to move or change the shape of the first area and the second area.

8. The image capturing apparatus according to claim 7, wherein the operation device is a touch panel provided in the display unit.

9. The image capturing apparatus according to claim 1, wherein the processor further function as:
    an exposure control unit configured to control an exposure in the focus bracketing,
    wherein the exposure control unit determines the exposure on the basis of a photometry result from the second area.

10. The image capturing apparatus according to claim 1, wherein the processor further function as:
    a first area setting unit configured to set the first area.

11. The image capturing apparatus according to claim 10, wherein as the first area, the first area setting unit sets an area in which a defocus amount is within a predetermined range relative to a defocus amount of a focus detection area serving as a reference.

12. The image capturing apparatus according to claim 10, wherein the first area setting unit sets an end of the first area with respect to a direction substantially orthogonal to a correlation direction in which the defocus amount is detected.

13. The image capturing apparatus according to claim 1, wherein the processor further function as:
    a second area setting unit configured to set the second area.

14. The image capturing apparatus according to claim 13, wherein as the second area, the second area setting unit sets an area of distribution from near to far with respect to a focus detection area serving as a reference.

15. The image capturing apparatus according to claim 14, wherein as the second area, the second area setting unit sets an area of substantially uniform distribution from near to far with respect to a focus detection area serving as a reference.

16. The image capturing apparatus according to claim 13, wherein the second area setting unit sets an end of the second area with respect to a direction substantially orthogonal to a correlation direction in which the defocus amount is detected.

17. A method of controlling an image capturing apparatus, the image capturing apparatus including an image sensor that captures an object image formed by the imaging lens and a focus detection unit for detecting a focus position of the imaging lens, the method comprising:

carrying out focus bracketing in which the image sensor is caused to capture a plurality of images while the focus position of the imaging lens is caused to change by predetermined amounts at a time;

displaying an image captured through the focus bracketing in a display device; and causing the display device to display a guide indicating a first area, a guide indicating a second area and a guide for prompting the user to set a composition for image capture so that an object suitable for the focus detection of the imaging lens is arranged in the first area and an object suitable for determining an image that is in focus is arranged in the second area, before the focus bracketing is carried out.

18. A non-transitory computer-readable storage medium storing a program for causing a computer to execute the steps of a method of controlling an image capturing apparatus, the image capturing apparatus including an image sensor that captures an object image formed by the imaging lens and a focus detection unit for detecting a focus position of the imaging lens, and the method comprising:

carrying out focus bracketing in which the image sensor is caused to capture a plurality of images while the focus position of the imaging lens is caused to change by predetermined amounts at a time;

displaying an image captured through the focus bracketing in a display device; and causing the display device to display a guide indicating a first area, a guide indicating a second area, and a guide for prompting the user to set a composition for image capture so that an object suitable for the focus detection of the imaging lens is arranged in the first area and an object suitable for determining an image that is in focus is arranged in the second area, before the focus bracketing is carried out.

* * * * *